(12) United States Patent
Yamane et al.

(10) Patent No.: US 11,395,050 B2
(45) Date of Patent: *Jul. 19, 2022

(54) RECEIVING APPARATUS, TRANSMITTING APPARATUS, AND DATA PROCESSING METHOD

(71) Applicant: SATURN LICENSING LLC, New York, NY (US)

(72) Inventors: Taketoshi Yamane, Kanagawa (JP); Naohisa Kitazato, Tokyo (JP); Jun Kitahara, Shizuoka (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/997,730

(22) Filed: Aug. 19, 2020

(65) Prior Publication Data

US 2020/0382847 A1 Dec. 3, 2020

Related U.S. Application Data

(63) Continuation of application No. 15/751,532, filed as application No. PCT/JP2016/072749 on Aug. 3, 2016, now Pat. No. 10,791,381.

(30) Foreign Application Priority Data

Aug. 17, 2015 (JP) .............................. JP2015-160698

(51) Int. Cl.
*H04N 21/8358* (2011.01)
*H04H 20/20* (2008.01)
(Continued)

(52) U.S. Cl.
CPC ........ *H04N 21/8358* (2013.01); *H04H 20/20* (2013.01); *H04H 60/372* (2013.01); *H04H 60/375* (2013.01); *H04N 21/812* (2013.01)

(58) Field of Classification Search
CPC ............. H04N 21/8358; H04N 21/812; H04N 21/4622; H04N 21/435; H04N 21/437;
(Continued)

(56) References Cited

U.S. PATENT DOCUMENTS 6,411,725 B1   6/2002   Rhoads
7,171,018 B2   1/2007   Rhoads
(Continued)

FOREIGN PATENT DOCUMENTS

CN   1355991 A    6/2002
CN   102377766 A  3/2012
(Continued)

OTHER PUBLICATIONS

Extended European Search Report dated Nov. 23, 2018 in European Patent appiication No. 16836981.7, citing document AA therein, 9 pages
(Continued)

*Primary Examiner* — Matthew Smithers
(74) *Attorney, Agent, or Firm* — Chris Kolefas

(57) ABSTRACT

There is provided an arrangement which is capable of reliably generating and transmitting viewing information with respect to contents received via a communication route other than terrestrial broadcasting waves. Contents in which a contents ID applicable to the generation of viewing information and viewing information-compatible data such as viewing information destination information or the like are recorded in an electronic watermark (WaterMark) or a sound data file are sent from a transmitting apparatus to a receiving apparatus. The receiving apparatus acquires the
(Continued)

contents ID and the viewing information destination information, etc. from the electronic watermark (WM) or the sound data file, generates viewing information using the acquired data, and sends the generated viewing information to a designated address.

20 Claims, 33 Drawing Sheets

(51) Int. Cl.
*H04H 60/37* (2008.01)
*H04N 21/81* (2011.01)

(58) Field of Classification Search
CPC ............... H04N 17/00; H04N 21/4341; H04N 21/4348; H04N 21/4353; H04N 21/439; H04H 20/20; H04H 60/372; H04H 60/375
See application file for complete search history.

(56) References Cited

U.S. PATENT DOCUMENTS

| | | | |
|---|---|---|---|
| 9,723,349 B2* | 8/2017 | Moon | H04N 21/4126 |
| 10,791,381 B2* | 9/2020 | Yamane | H04H 60/375 |
| 2004/0009763 A1* | 1/2004 | Stone | H04H 20/14 |
| | | | 455/410 |
| 2007/0136782 A1 | 6/2007 | Ramaswamy | |
| 2009/0110231 A1 | 4/2009 | Rzeszewski | |
| 2011/0069937 A1 | 3/2011 | Toerner | |
| 2012/0158802 A1 | 6/2012 | Lakshmanan et al. | |
| 2012/0163653 A1 | 6/2012 | Anan | |
| 2012/0207342 A1* | 8/2012 | Quail | H04N 21/42684 |
| | | | 382/100 |
| 2013/0007790 A1* | 1/2013 | McMillan | H04H 60/43 |
| | | | 725/14 |
| 2013/0151855 A1* | 6/2013 | Petrovic | H04N 21/8358 |
| | | | 713/176 |
| 2013/0151856 A1* | 6/2013 | Petrovic | G06F 21/10 |
| | | | 713/176 |
| 2014/0047475 A1 | 2/2014 | Oh | |
| 2014/0075469 A1* | 3/2014 | Zhao | H04N 21/435 |
| | | | 725/32 |
| 2014/0282695 A1 | 9/2014 | Bakar | |
| 2014/0344033 A1 | 11/2014 | Driscoll | |
| 2015/0049900 A1 | 2/2015 | Kamitani | |
| 2015/0052570 A1 | 2/2015 | Lee et al. | |
| 2016/0119691 A1 | 4/2016 | Accardo | |
| 2016/0182973 A1 | 6/2016 | Winograd | |
| 2017/0111692 A1 | 4/2017 | An | |
| 2018/0014064 A1 | 1/2018 | Deshpande | |

FOREIGN PATENT DOCUMENTS

| | | |
|---|---|---|
| CN | 103138860 A | 6/2013 |
| CN | 104205107 A | 12/2014 |
| CN | 101558589 B | 11/2015 |
| EP | 1 209 904 A2 | 5/2002 |
| JP | 2002-290889 A | 10/2002 |
| JP | 2010-124036 A | 6/2010 |
| JP | 2014-57227 A | 3/2014 |

OTHER PUBLICATIONS

Combined Chinese Office Action and Search Report dated Dec. 3, 2019, in Patent Application No. 201680047230.0 (with English translation), citing documents AB and AO - AR therein, 13 pages.
International Search Report dated Nov. 1, 2016 in PCT/JP2016/072749, filed Aug. 3, 2016.
DVB Organization: S1 3-2-389r7-A1 05-ISS-Candidate-Standard. pdf, DVB, Digital Video Broadcasting. 0/0 EBU—17A Ancienne Route—CH-1218 Grand Saconnex, Geneva—Switzerland, Aug. 6, 2014 (Aug. 6, 2014).
Kaiser et al.;"MPEG-DASH Enabling Adaptive Streaming with Personalized Commercial Breaks and Second Screen Scenarios", 2013, ACM, pp. 63-66. (Year: 2013).
Concolato et al.; "Usages of DASH for Rich Media Services", 2011, ACM, pp. 265-270. (Year: 2011).
Liu et al.; "Watermarking Protocol for Broadcast Monitoring", 2010, IEEE, pp. 1634-1637. (Year: 2010).

* cited by examiner

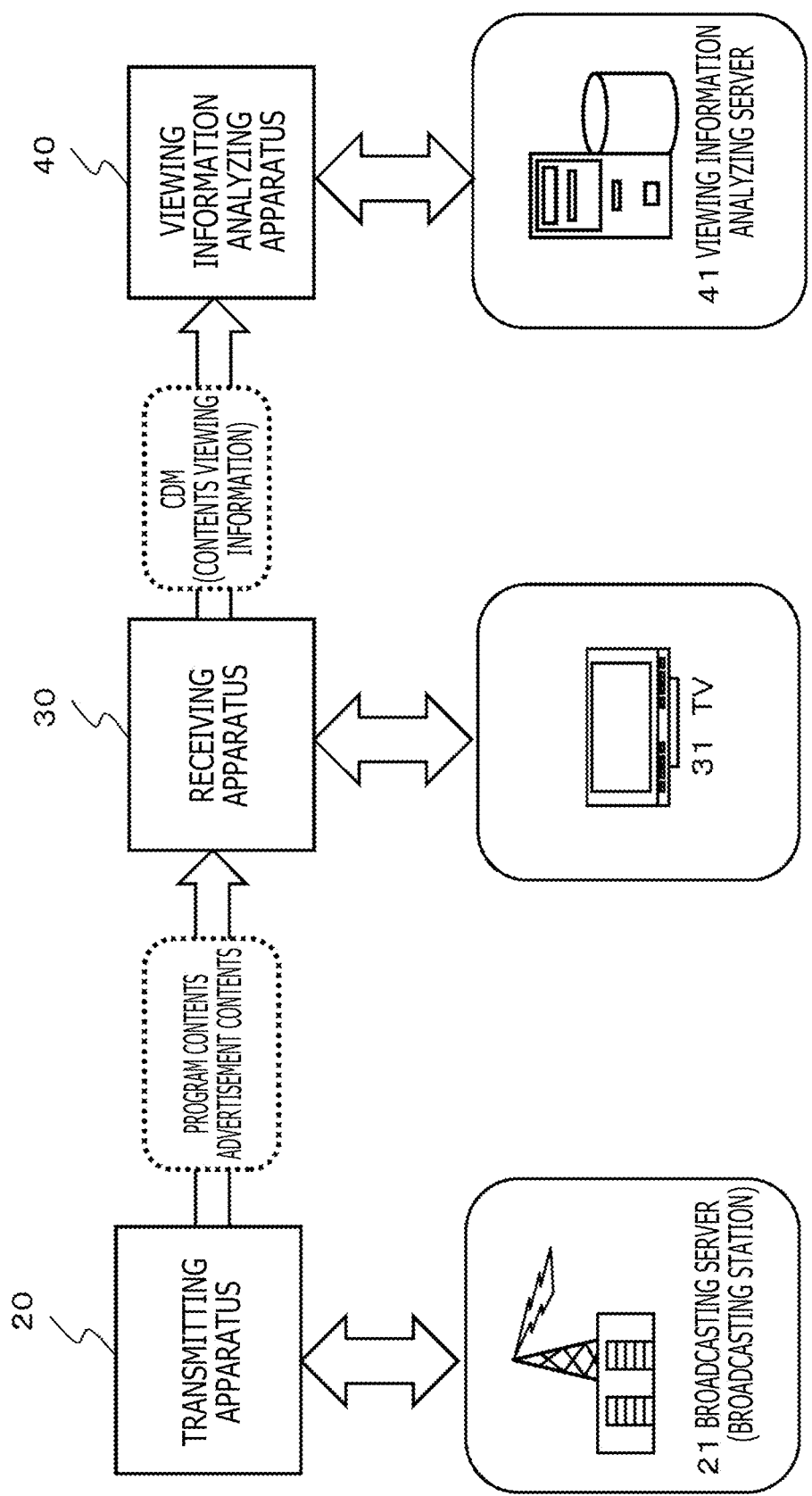

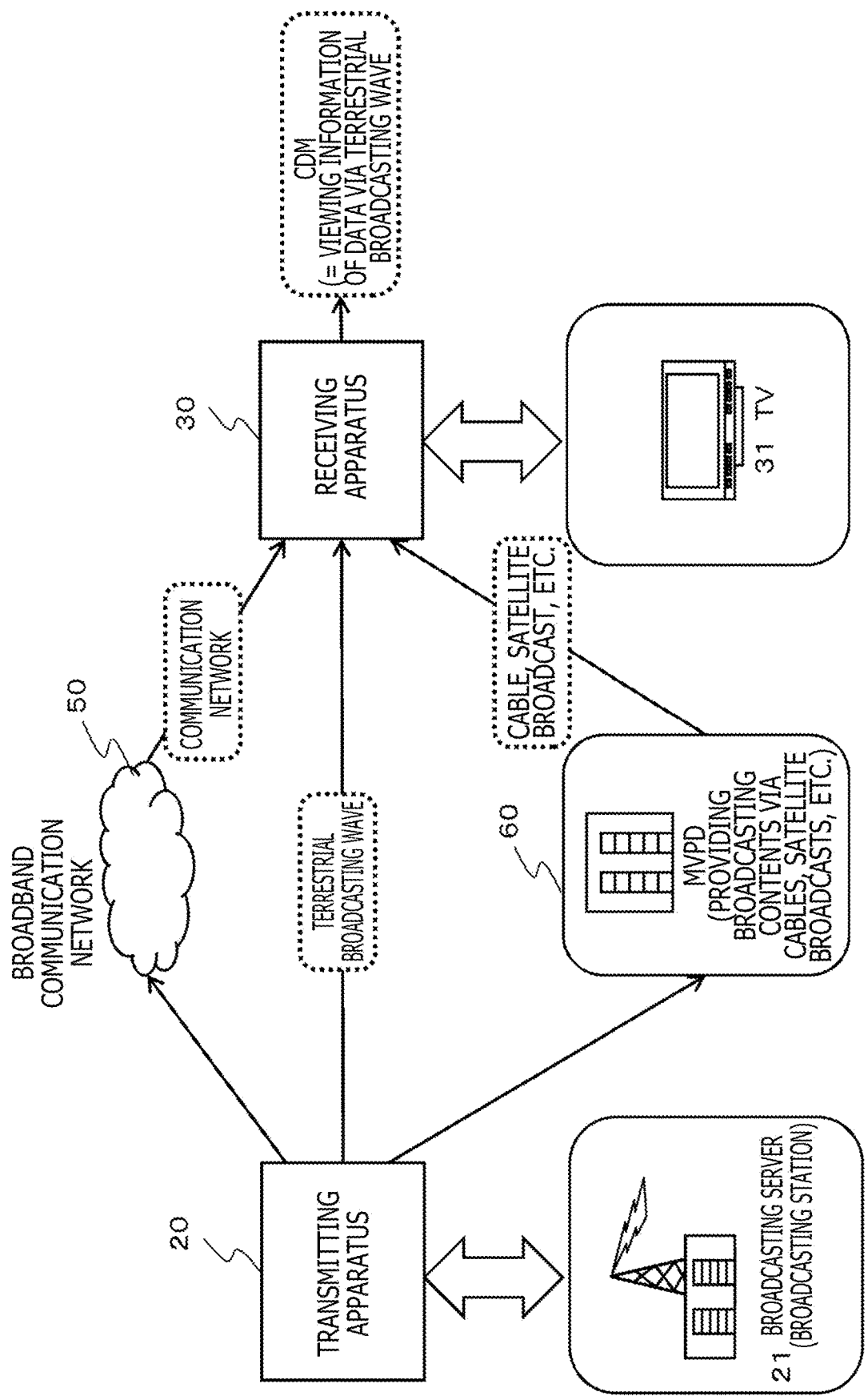

F I G . 3

| Element (or Attribute with @) | Cardinality | Data Type | Description |
|---|---|---|---|
| CDM | 1 | | Consumption Data Message |
| @protocolVersion | 1 | hexBinary | Major Version of CDM protocol |
| AVChannel | 1..N | | |
| @channelNum | 1 | hexBinary | Virtual Channel number — VIEWING CHANNEL NUMBER |
| @serviceType | 1 | unsignedByte | e.g., Television, Audio only. Parameterized |
| ViewInterval | 1..N | | Virtual channel viewing interval |
| @startTime | 1 | dateTime | Start time of interval — VIEWING START TIME |
| @endTime | 1 | dateTime | End time of interval — VIEWING END TIME |
| @usageType | 1 | int | Full screen, PIP, etc. |
| @viewStartTime | 0..1 | dateTime | |
| @startTime | 1 | dateTime | Start time of interval |
| @endTime | 1 | dateTime | End time of interval |
| NRTItem | 0..N | | Content item usage interval |
| @contentItemId | 1 | string | Content item content linkage |
| @startTime | 1 | dateTime | Start time of interval |
| @endTime | 1 | dateTime | End time of interval |

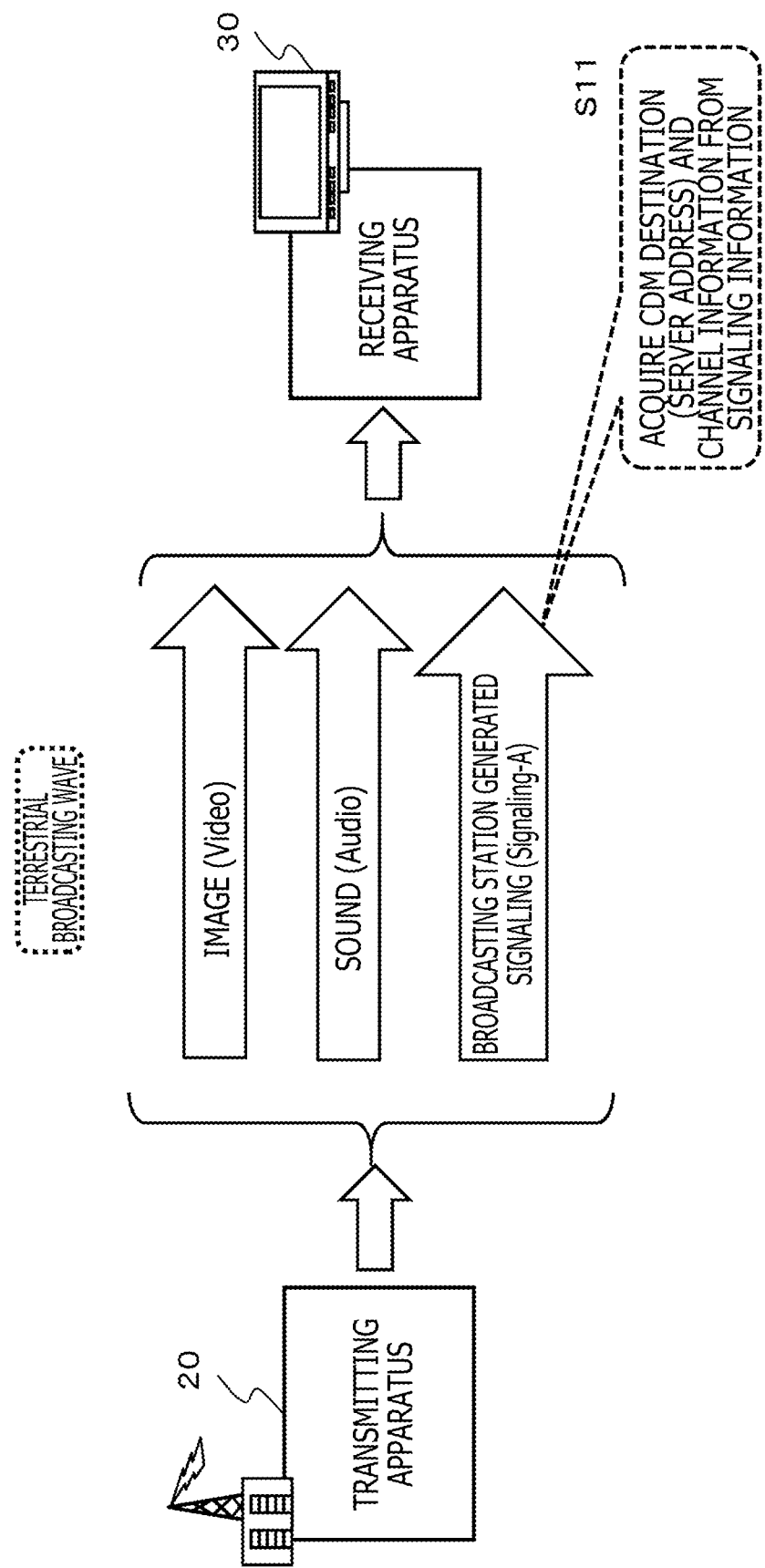

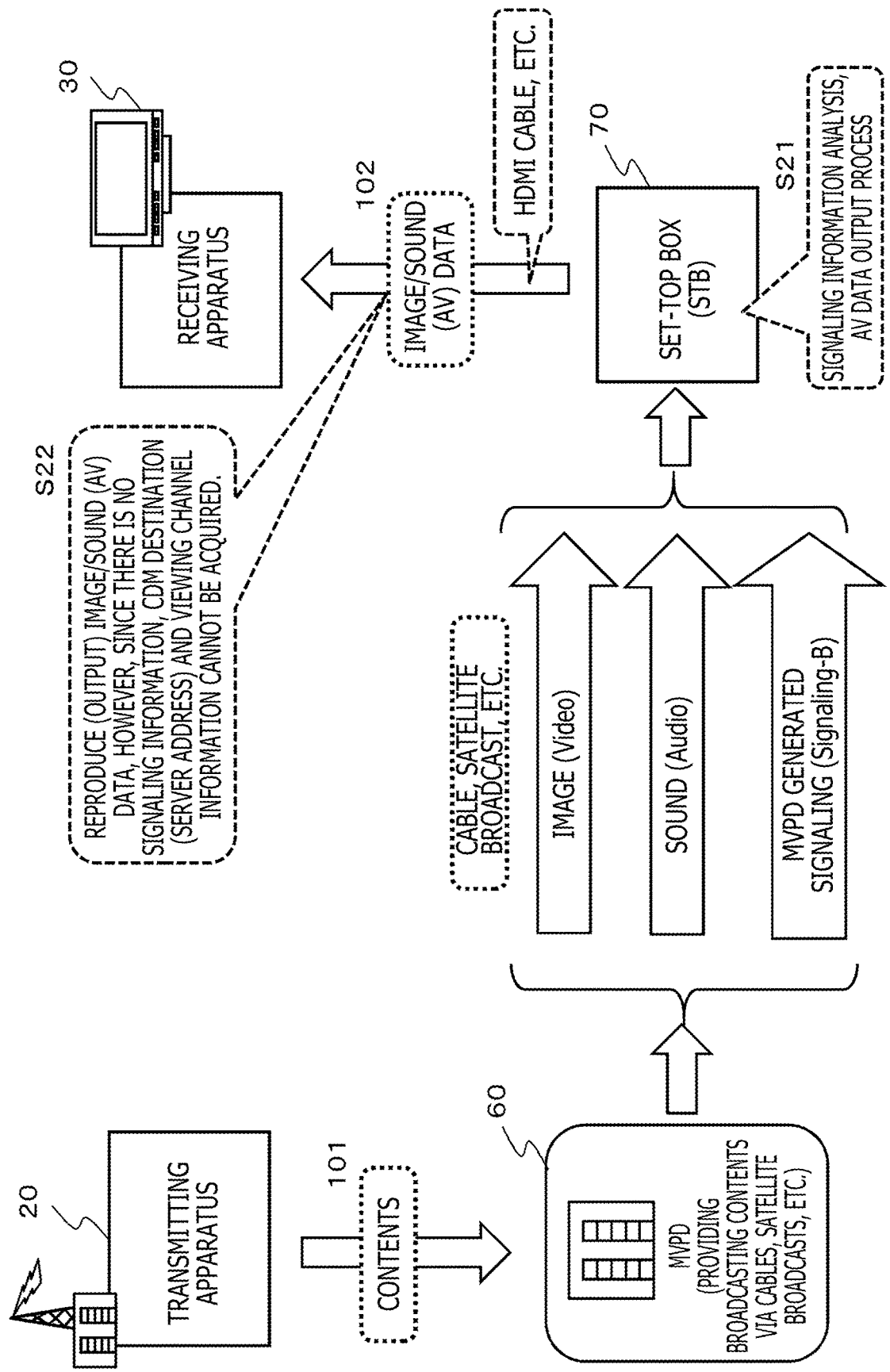

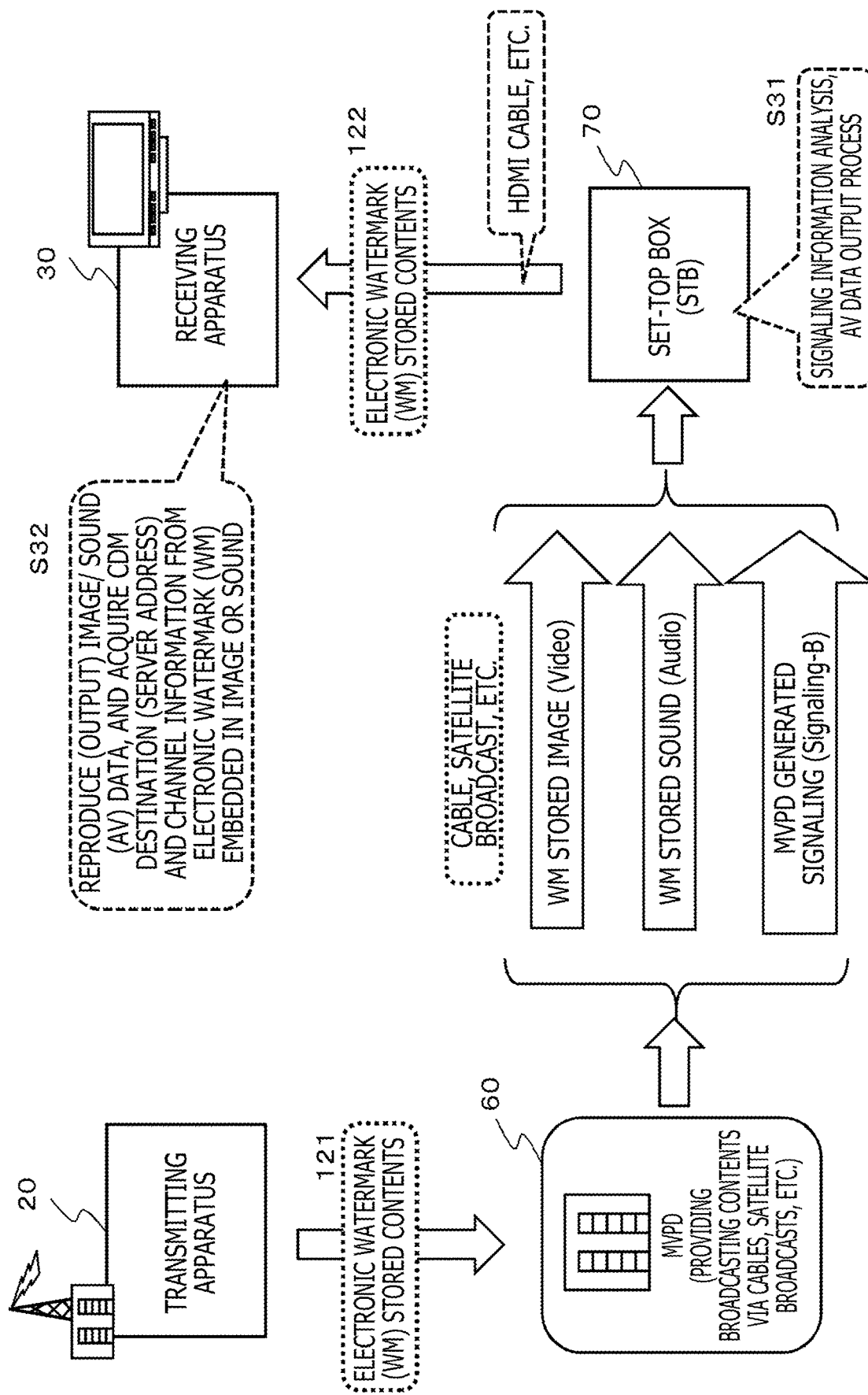

FIG. 7

(1) IMAGE ELECTRONIC WATERMARK (VIDEO WM) INFORMATION

| Syntax | No. of Bits | Format |
|---|---|---|
| wm_message(){ | | |
| wm_message_id | 8 | uimsbf |
| wm_message_length | 8 | uimsbf |
| wm_message_sequence | 4 | uimsbf |
| fragment_number | 2 | uimsbf |
| last_fragment | 2 | uimsbf |
| switch (wm_message_id){ | | |
| case 0x01 | | |
| content_id_message() | var | |
| break | | |
| case 0x02 | | |
| channel_id_message() | var | |
| break | | |
| case 0x03 | | |
| uri_message() | var | |
| break | | |
| default | 8 | uimsbf6 |
| reserved | var | |

(1a) CONTENTS ID INFORMATION → content_id_message()

(1b) CHANNEL ID INFORMATION → channel_id_message()

(1c) CDM TRANSMISSION ADDRESS INFORMATION (URI) → uri_message()

FIG. 8

(1) IMAGE ELECTRONIC WATERMARK (VIDEO WM) INFORMATION

| Syntax | No. of Bits | Format |
|---|---|---|
| wm_message(){ | | |
| wm_message_id | | |
| wm_message_length | | |
| wm_message_sequence | | |
| fragment_number | | |
| last_fragment | | |
| switch (wm_message_id){ | | |
| case 0x01 | | |
| content_id_message() | | |
| break | | |
| case 0x02 | | |
| channel_id_message() | | |
| break | | |
| case 0x03 | | |
| uri_message() | | |
| break | | |
| default | | |
| reserved | | |
| } | | |
| } | | |

(1a) CONTENTS ID INFORMATION

| Syntax | No. of Bits | Format |
|---|---|---|
| content_id_message(){ | | |
| media_time_present | 1 | bslbf |
| media_time_ms_present | 1 | bslbf |
| reserved | 1 | 1 |
| content_ID_type (ID TYPE) | 5 | uimsbf |
| if (content ID type==EIDR){ | | |
| EIDR (PROGRAM CONTENTS ID (EIDR)) | 96 | uimsbf96 |
| } else { | | |
| if (content ID type==adID){ | | |
| adID_strlen | 8 | uimsbf |
| adID_string() (ADVERTISEMENT CONTENTS ID (ad ID)) | adID_strlen*8 | ASCII char string |
| } | | |
| } else { | | |
| } | | |
| if (media_time_present){ | | |
| media_time | 16 | uimsbf6 |
| } | | |
| if (media_time_ms_present){ | | |
| reserved | 6 | 111111 |
| media_time_ms | 10 | uimsbf |
| } | | |
| } | | |

FIG. 9

(1) IMAGE ELECTRONIC WATERMARK (VIDEO WM) INFORMATION

| Syntax | |
|---|---|
| wm_message() { | |
| wm_message_id | |
| wm_message_length | |
| wm_message_sequence | |
| fragment_number | |
| last_fragment | |
| switch (wm_message_id){ | |
| case 0x01 | |
| content_id_message() | |
| break | |
| case 0x02 | |
| channel_id_message() | |
| break | |
| case 0x03 | |
| uri_message() | |
| break | |
| default | |
| reserved | |
| } | |
| } | |

(1b) CHANNEL ID INFORMATION

| Syntax | No. of Bits | Format |
|---|---|---|
| channel_id_message() { | | |
| BSID | 16 | uimsbf |
| reserved | 4 | 1111 |
| major_channel_no (MAJOR CHANNEL NUMBER) | 10 | uimsbf |
| minor_channel_no (MINOR CHANNEL NUMBER) | 10 | uimsbf |
| } | | |

(1c) CDM TRANSMISSION ADDRESS INFORMATION (URI)

| Syntax | No. of Bits | Format |
|---|---|---|
| uri_message() { | | |
| uri_type (URI TYPE) | 8 | uimsbf |
| uti_strlen | 8 | uimsbf |
| uri_string() (URI INFORMATION) | 8*uristrlen | |
| } | | |

FIG. 10

(1c) CDM TRANSMISSION ADDRESS INFORMATION (URI)

| Syntax | No. of Bits | Format |
|---|---|---|
| uri_message() | | |
| uri_type | 8 | uimsbf |
| uti_strlen | 8 | uimsbf |
| uri_stering() | 8*uristrlen | |
| } | | |

(1d) URI TYPE INFORMATION

| URI TYPE SETTING VALUE (uri_type_value) | MEANING (Meaning) |
|---|---|
| 0x00 | AIT_URL |
| 0x01 | MPD_URL |
| 0x02 | ESG_URL |
| 0x03 | CDM_URL |
| 0x04—0xFF | Reserved |

FIG. 11

(2) SOUND ELECTRONIC WATERMARK (AUDIO WM) INFORMATION

| Attribute name | | Use | Format | Description |
|---|---|---|---|---|
| RecoveryData | | Use | Format | Description |
| @timeAnchor *(2a) CHANNEL ID INFORMATION* | | 1 | xs:dateTime | Indicate the Plant UTC time of the starting frame boundary ... |
| ChannelId | | 0,1 | | |
| | @bsId | 1 | xs:hexBinary | Identifier of the 16-bit Broadcast Stream ID of the original emission signal |
| | @majorChannelNo *MAJOR CHANNEL NUMBER* | 1 | xs:int | An Integer number in the range 1 to 1000 representing the major channel number of the service |
| | @minorChannelNo *MINOR CHANNEL NUMBER* | 1 | xs:int | An Integer number in the range 1 to 1000 representing the minor channel number of the service |
| Event | | 0,N | | |
| | @eventId | 1 | xs:int | Unique Identifier for this event within the scope of the watermark segment. Used by the receiver to de-deduplicate events which appear in multiple recoveryu information files. |
| | @eventTime | 1 | xs:int | Plant UTC time that this event is to occur |
| | <Choice> | 0,1 | | Choice among Trigger, Query, and ContentID. if not present, the Event identified by @eventId is canceled. |
| | Trigger *(2b) TRIGGER INFORMATION* | | | Event signalling a Trigger |
| | Query | | | Event signalling a Query |
| | ContentID *(2c) CONTENTS ID INFORMATION* | | | Event signalling a Content Identifier |

FIG. 12

(2b) TRIGGER INFORMATION

| Attribute name | | Use | Format | Description |
|---|---|---|---|---|
| Trigger | | | | Recovery file element for a trigger event |
| | @trigger *(TRIGGER INFORMATION (URI RECORDING AREA))* | 1 | xs:anyURL | A URL with optional query terms |
| | @version | 0,1 | xs:int | Indicates the version of this instance of the trigger |
| | @uriType *(URI TYPE INFORMATION)* | 1 | xs:int | indicates the type of trigger given in trigger coded per Table x.x. |

(2d) URI TYPE INFORMATION

| URI TYPE SETTING VALUE (uriType) | MEANING (Meaning) |
|---|---|
| AIT | Acquire AIT(+EMT/CCT) file then access and control app |
| MPD | Acqire MPD file then access optional available broadband-delivered Content Component to realize hybrid video service |
| ESG | Acqire an ESG file related to the current progarm to provide program information |
| CDM | Upload CDM to Usage Reporting Data server |
| other | Reserved |

FIG. 13

(2c) CONTENTS ID INFORMATION

| Attribute name | | Use | Format | Description |
|---|---|---|---|---|
| ContentID | | | | Recovery file element for a content ID event |
| | @type | 1 | xs:string | Defined values EIDR, Ad-ID |
| | @contentID | 1 | xs:string | Either an EIDR(34-character canonical form with hyphens) or Ad-ID(12-character canonical form) |

@type: ID TYPE

@contentID: CONTENTS ID (EIDR OR ad ID)

F I G . 1 6

(1) PRESENT CDM FORMAT

| Element (or Attribute with @) | Cardinality | Data Type | Description |
|---|---|---|---|
| CDM | 1 | | Consumption Data Message |
| @protocolVersion | 1 | hexBinary | Major Version of CDM protocol |
| AVChannel | 1..N | | |
| @channelNum | 1 | hexBinary | Virtual Channel number |
| @serviceType | 1 | unsignedByte | e.g., Television, Audio only. Parameterized |
| ViewInterval | 1..N | | Virtual channel viewing interval |

(VIEWING CHANNEL NUMBER)

(2) EXTENDED CDM FORMAT

| Element (or Attribute with @) | Cardinality | Data Type | Description |
|---|---|---|---|
| CDM | 1 | | Consumption Data Message |
| @protocolVersion | 1 | hexBinary | Major & minor Version of CDM protocol |
| AVService | 1..N | | |
| @SourceofService | 1 | Int | 1:Broadcast, 2: Broadband, 3: Hybrid(both Broadcast and Broadband), 4: External, 5~: reserved |
| ContentID | 1 | String | 1: Virtual Channel number, 2: EIDR 3: Ad-ID 4~: reserved |
| @type | 1 | Int | |

(a) SERVICE SOURCE INFORMATION
(b) CONTENTS ID INFORMATION
(c) CONTENTS ID TYPE INFORMATION

FIG. 17

(a) SERVICE SOURCE INFORMATION (@SourceofService)

| | SETTING VALUE | SERVICE SOURCE |
|---|---|---|
| (1) | 1 | TERRESTRIAL BROADCASTING WAVE (Broadcast) |
| (2) | 2 | BROADBAND COMMUNICATION NETWORK (Broadband) |
| (3) | 3 | HYBRID (Hybrid (Broadcast & Broadband) |
| (4) | 4 | OTHERS (External)<br>(= CATV, SATELLITE BROADCAST, ETC. VIA MVPD) |
| (5) | 5 | RESERVED (Reserved) |

FIG. 18

(c) CONTENTS ID TYPE INFORMATION (@type)

| SETTING VALUE | MEANING OF RECORDED ID OF CONTENTS ID INFORMATION RECORDING FIELD |
|---|---|
| (1) 1 | CHANNEL NUMBER (Virtual Channel number) |
| (2) 2 | PROGRAM IDENTIFIER (EIDR) |
| (3) 3 | ADVERTISEMENT IDENTIFIER (Ad-ID) |
| (4) 4 | RESERVED (Reserved) |

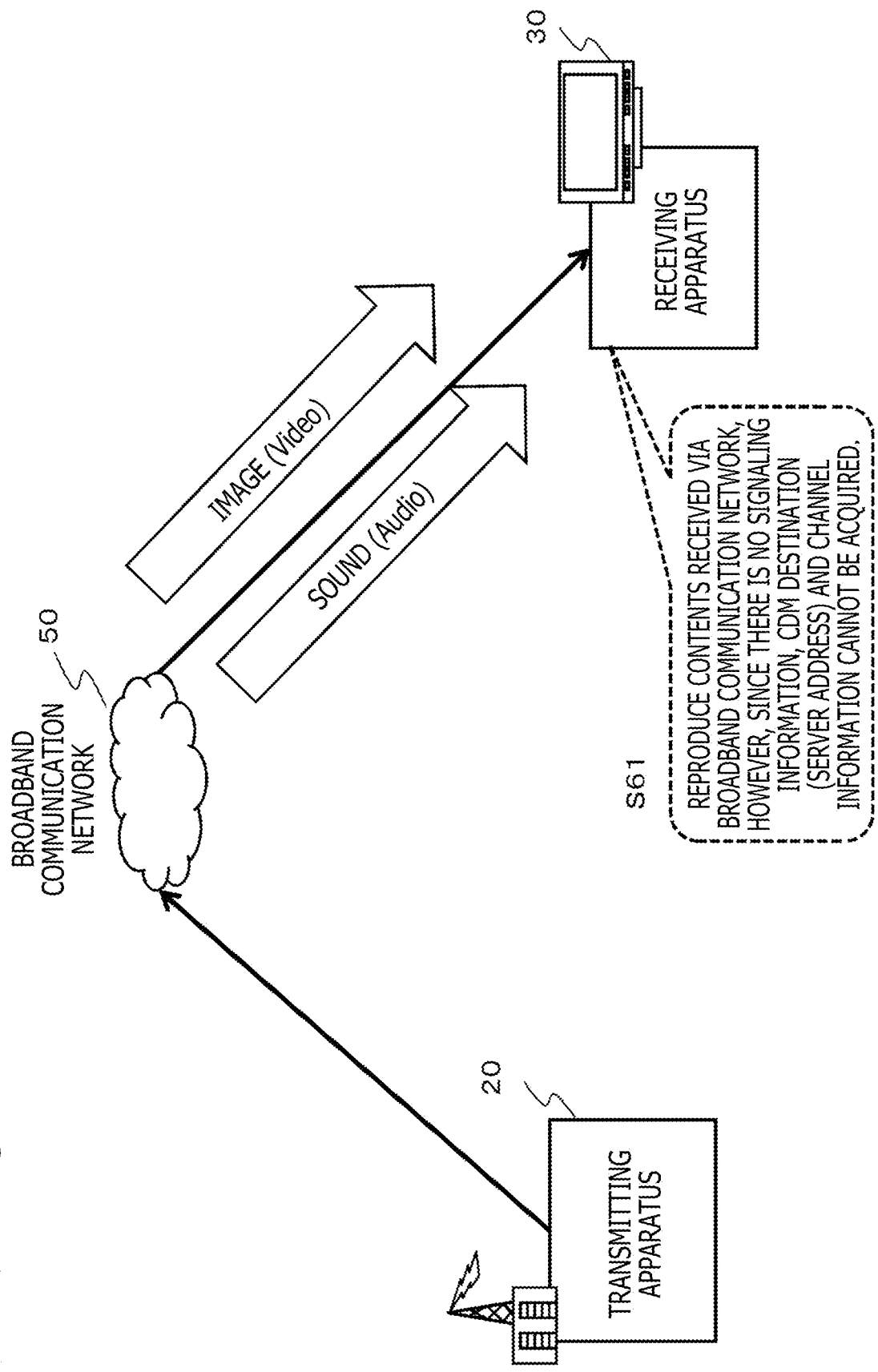

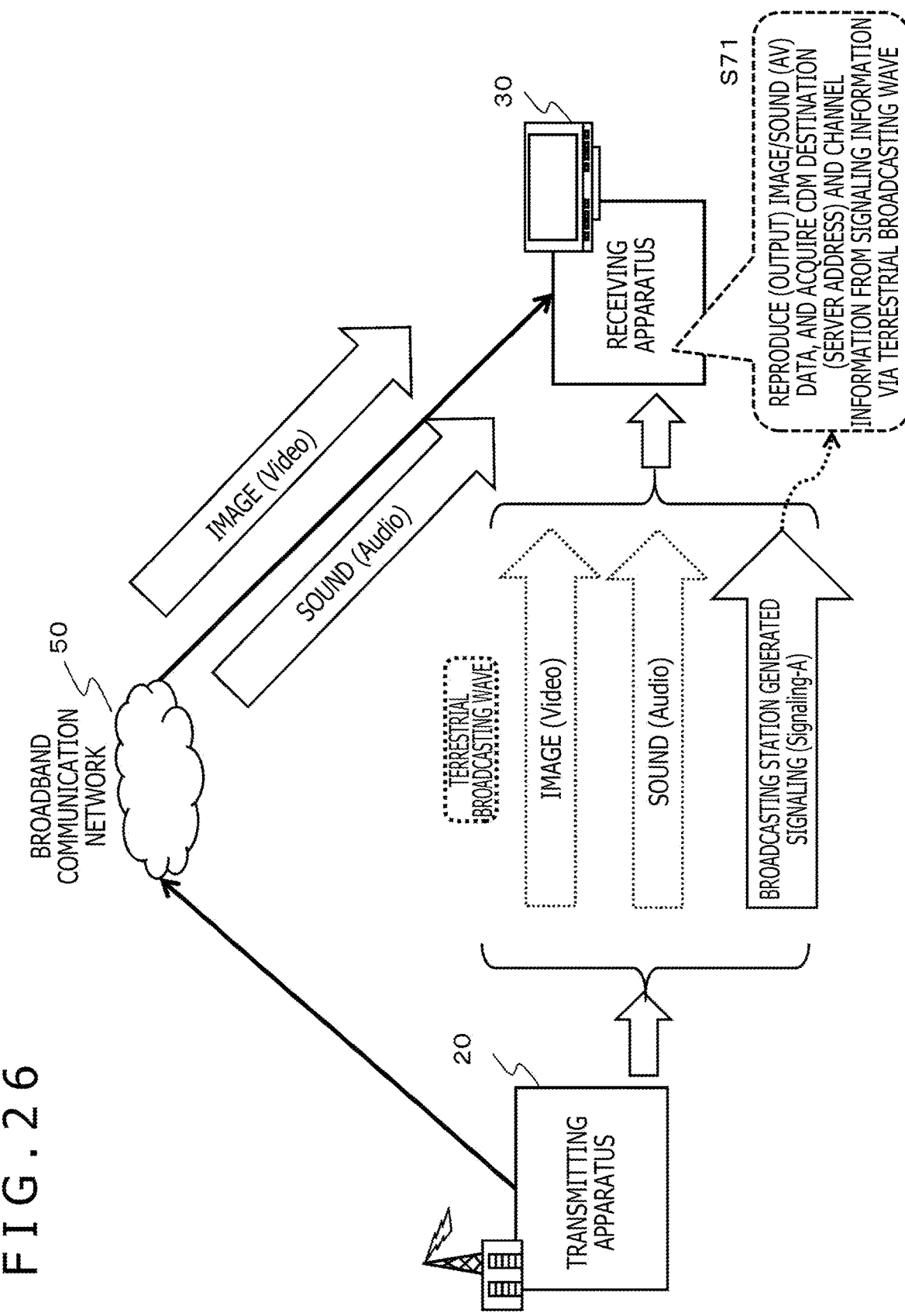

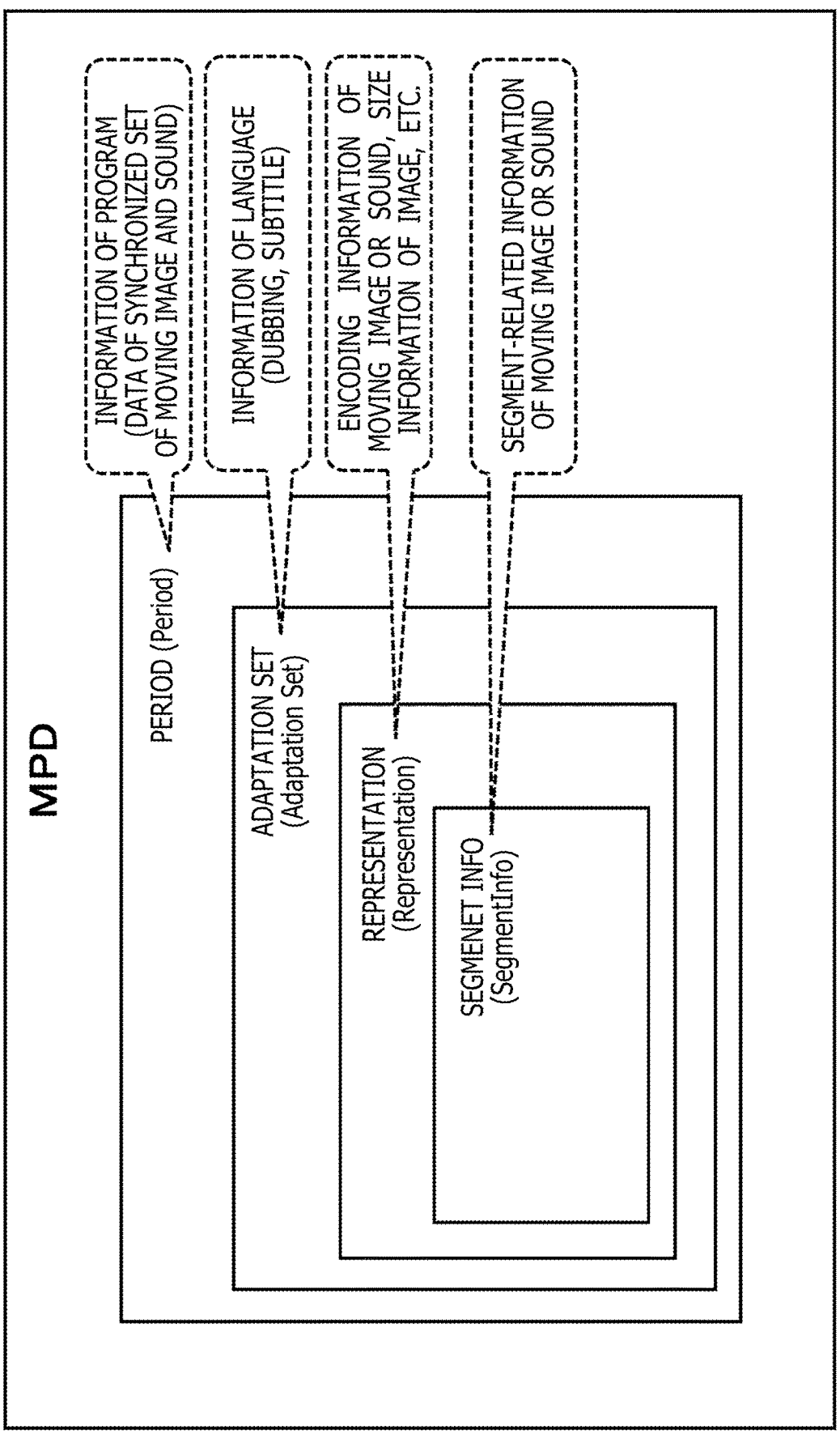

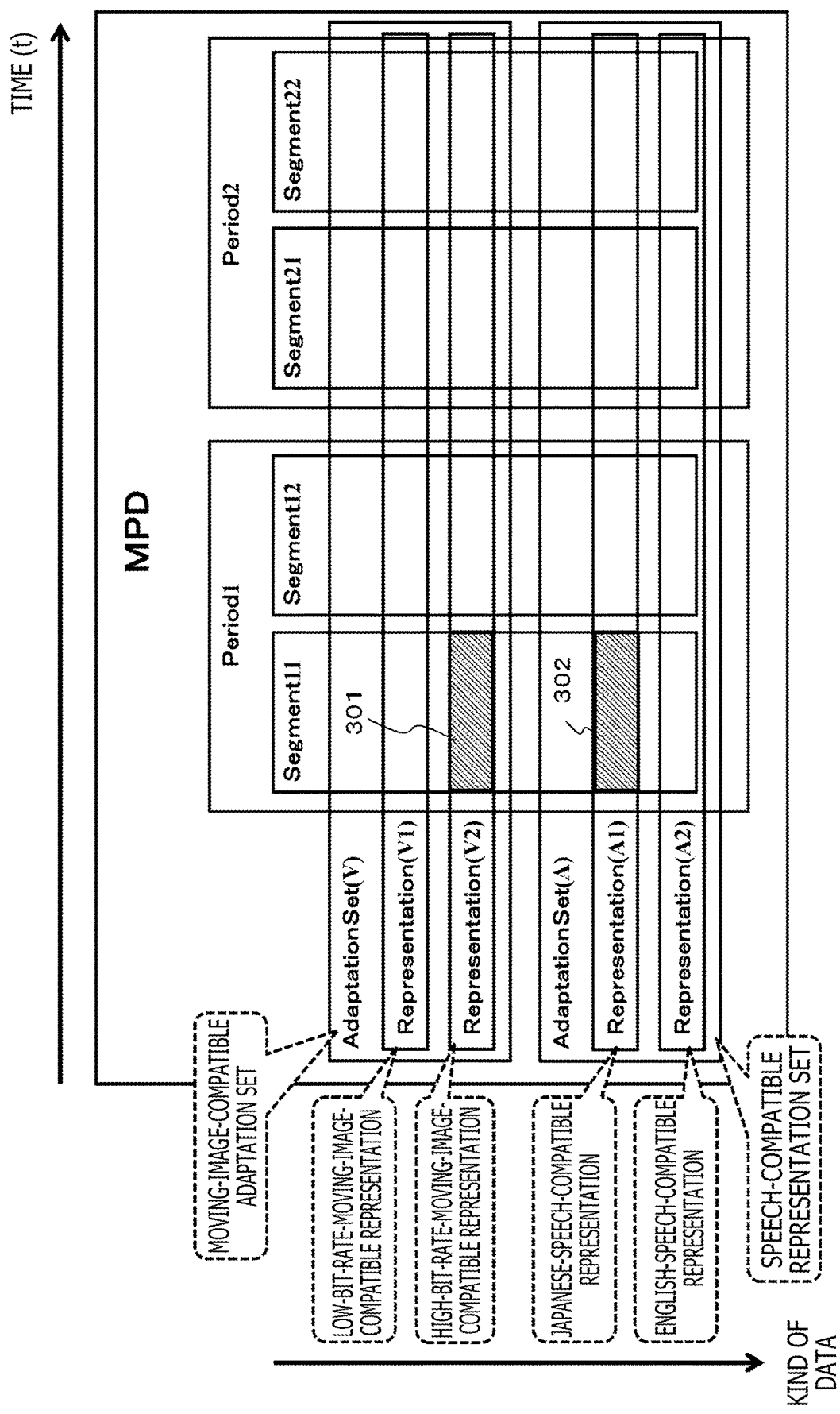

FIG. 29

```
<MPD type="dynamic" ... availabilityStartTime="2012-12-25T15:17:50">
...
<!-- Movie -->
<Period start="PT0.00S" duration="PT600.6S" id="movie period #1">
<AssetIdentifier schemeIdUri="urn:org:dashif:asset-id:2013"
value="md:cid:EIDR:10.5240%2f0EFB-02CD-126E-8092-1E49-W" >   (a) CONTENTS ID
<AdaptationSet mimeType="video/mp4" ... >
<SegmentTemplate timescale="90000" initialization="1000000/init.mp4v"
media="$Number%05d$.mp4v"/>
<Representation id="v2" width="960" height="720" ... />
</AdaptationSet>
</Period>
```

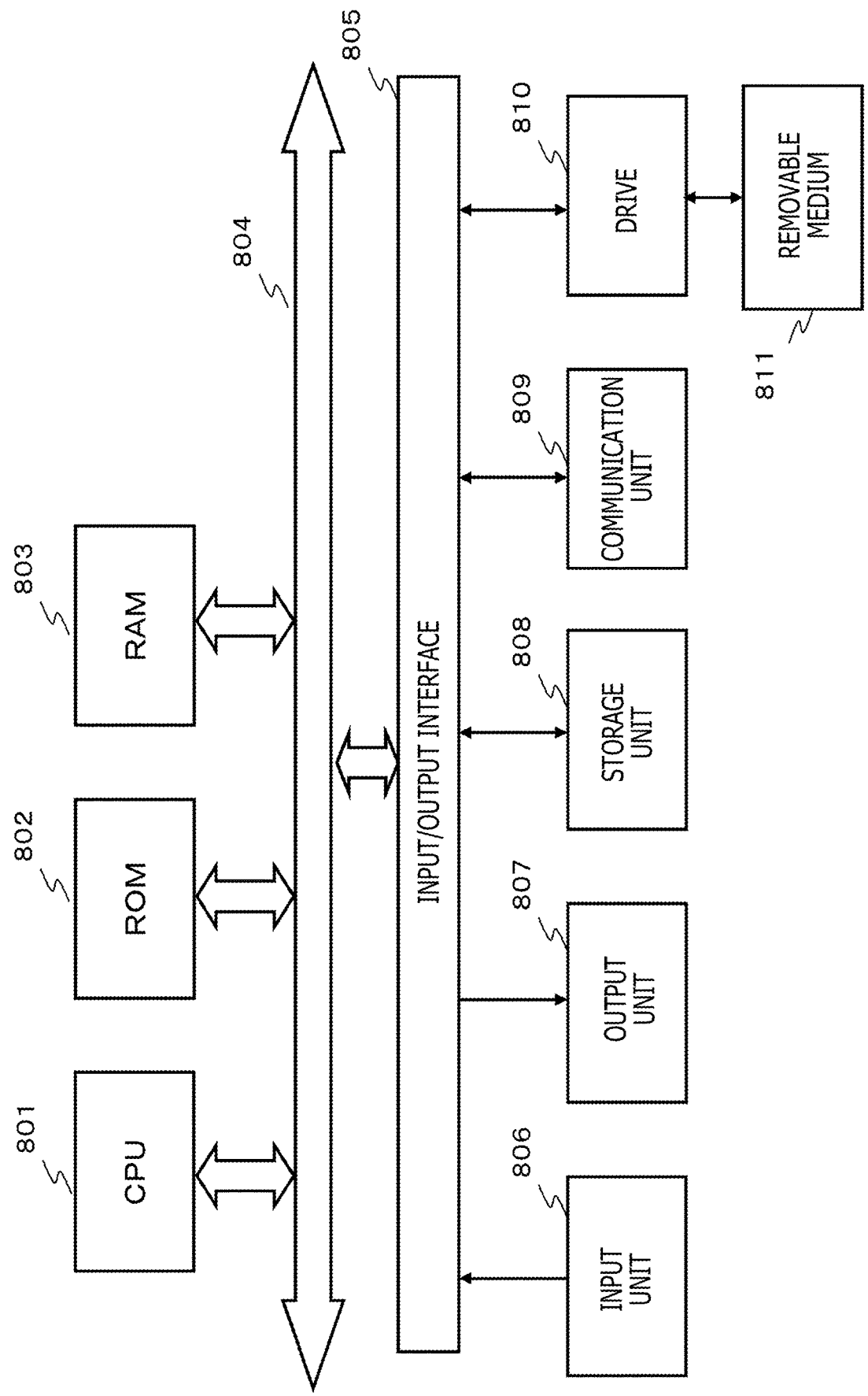

RECEIVING APPARATUS, TRANSMITTING APPARATUS, AND DATA PROCESSING METHOD

CROSS REFERENCE TO RELATED APPLICATIONS

This application is a continuation of U.S. Ser. No. 15/751,532 filed Feb. 9, 2018, which is a National Stage of PCT/JP2016/072749, filed Aug. 3, 2016 and claims the benefit of Japanese Priority Patent Application JP 2015-160698 filed on Aug. 17, 2015. The entire contents of U.S. Ser. No. 15/751,532 are incorporated herein by reference.

TECHNICAL FIELD

The present disclosure relates to a receiving apparatus, a transmitting apparatus, and a data processing method. More specifically, the present disclosure relates to a receiving apparatus and a transmitting apparatus that perform the reception and transmission of data via broadcasting waves and a network, for example, and a data processing method for communication data.

BACKGROUND ART

Currently, efforts are making active progress in the development and standardization of systems for sending and receiving contents such as broadcast programs, etc. using unidirectional communication via broadcasting waves or using bidirectional communication and unidirectional communication via networks such as the Internet, etc. from transmitting apparatus such as broadcasting stations and other contents servers, etc. to receiving apparatus such as TV sets, PCs, and portable terminals, etc.

Incidentally, PTL 1 (JP 2014-057227A), for example, is available as conventional art disclosing a technology for realizing data distribution via broadcasting waves and networks.

Standards about data distribution systems via broadcasting waves and networks in the USA include ATSC (Advanced Television Systems Committee)2.0. Moreover, standardization of ATSC3.0 is now in progress.

ATSC3.0 is addressed to a review of configurations in which receiving apparatus such as TV sets or the like that implement an ATSC3.0-conformable physical layer (ATSC-PHY) and middleware for carrying out an ATSC3.0 broadcast receiving process receive AV segments compatible with ATSC broadcasts and signaling data with control information stored therein and reproduce broadcast contents on the basis of various control processes according to the signaling data.

Specifically, ATSC3.0 is reviewing configurations that make it possible to perform a process of outputting broadcast contents directly using application programs used on the Internet, etc., i.e., so-called client applications, and a data processing process using various applications provided by broadcasting waves, under control based on signaling data, for example.

Furthermore, ATSC2.0 and ATSC3.0, which are standards about the data distribution systems described above, include provisions concerning standards (Usage Reporting) for collecting broadcast service viewing records in receiving apparatus such as user's TV sets or the like.

They prescribe a procedure for a broadcast service reception terminal such as a TV set or the like owned by each user to analyze how a broadcast service is viewed, produce a CDM (Consumption Data Message) as a viewing information report, and send the CDM from the user's terminal (TV set or the like) to a viewing information analyzing server (Service Usage Data Server) as a viewing information analyzing apparatus.

However, according to the standards about the present process of sending viewing information where the CDM is applied, the CDM that serves as a viewing situation report is of such a format that only the contents that a user's terminal such as a TV set or the like has directly received via terrestrial broadcasting waves are expected to be reported.

In the USA, approximately 70% households receive broadcast services from cable broadcasting organizations and satellite broadcasting organizations, and only 30% of all the households receive broadcast services directly via terrestrial wave broadcasts.

There are many cable broadcasting organizations and satellite broadcasting organizations in the USA, and these cable broadcasting organizations and satellite broadcasting organizations are called MVPDs (Multichannel Video Programming Distributors).

The terrestrial broadcasting stations in the USA that are referred to as four major networks send broadcasting contents via terrestrial broadcasting waves and also provide broadcasting contents to MVPDs.

The MVPDs perform a data conversion process, e.g., a scrambling process or the like, on broadcasting contents received from broadcasting stations according to a unique transmission format of their own, and send the processed broadcasting contents to set-top boxes (STB) provided by the MVPD companies and installed on user's terminals such as TV sets or the like.

The STB on each user's terminal performs a process according to an algorithm compatible with the format unique to the MVPD, e.g., a descrambling process, on the received broadcasting contents, and outputs the processed broadcasting contents to the user's terminal such as a TV set or the like connected to the STB, so that the contents are reproduced on the TV set or the like.

The MVPD organizations operate in a system in which they also provide users with various video contents, e.g., charged contents, in addition to the contents provided by the terrestrial broadcasting stations called four major networks in the USA, and collect viewing charges for the provided contents from the users.

In the USA, as described above, there are more users who receive contents via MVPDs and reproduce the contents than users who directly receive terrestrial wave broadcasts and reproduce them.

Therefore, the CDM described above as viewing experience report data is problematic in that it fails to reflect contents viewing records achieved via cables and satellite services that account for approximately 70% of all the households.

ACTS3.0 also stipulates services for distributing viewing contents through broadband communication networks such as the Internet or the like.

The CDM in current use is also problematic in that it fails to reflect viewing records about broadband communication network distributions.

CITATION LIST

Patent Literature

[PTL 1]
JP 2014-057227A

SUMMARY

Technical Problem

The present disclosure has been made in view of the above problems, for example. It is an object of the present disclosure to provide a receiving apparatus, a transmitting apparatus, and a data processing method that are capable of acquiring viewing information of contents which are received via routes other than terrestrial broadcasting waves by receiving apparatus as user's terminals such as TVs or the like and of sending the acquired viewing information to a viewing information analyzing apparatus.

Solution to Problem

According to a first aspect of the present disclosure, there is provided a receiving apparatus including:

a communication unit that receives contents in which viewing information-compatible data applicable to generation of viewing information are embedded as an electronic watermark (WM); and a data processor that performs a process of generating viewing information using the viewing information-compatible data acquired from the electronic watermark (WM) embedded in the received contents.

Further, according to a second aspect of the present disclosure, there is provided a receiving apparatus including:

a communication unit that receives contents in which viewing information-compatible data applicable to generation of viewing information are stored in a sound data storage file; and a data processor that performs a process of generating viewing information using the viewing information-compatible data acquired from recording data in the sound data storage file of the received contents.

Further, according to a third aspect of the present disclosure, there is provided a receiving apparatus including:

a communication unit that receives signaling data storing therein viewing information-compatible data applicable to generation of viewing information and that receives reproduction contents via a communication path different from a reception route of the signaling data; in which the receiving apparatus outputs the reproduction contents to an output unit, acquires recording data of viewing information with respect to output contents of the output unit from the signaling data, generates viewing information using the acquired data, and sends the generated viewing information to a viewing information analyzing apparatus.

Further, according to a fourth aspect of the present disclosure, there is provided a transmitting apparatus including:

a data processor that sends viewing information-compatible data applicable to generation of viewing information in a receiving apparatus, by generating contents recorded in a reproduction data storage file.

Further, according to a fifth aspect of the present disclosure, there is provided a data processing method adapted to be carried out in a receiving apparatus, in which a communication unit receives contents in which viewing information-compatible data applicable to generation of viewing information are embedded as an electronic watermark (WaterMark); and a data processor performs a process of generating viewing information using the viewing information-compatible data acquired from the electronic watermark (WM) embedded in the received contents.

Further, according to a sixth aspect of the present disclosure, there is provided a data processing method adapted to be carried out in a transmitting apparatus, in which a data processor sends viewing information-compatible data applicable to generation of viewing information in a receiving apparatus, by generating contents recorded in a reproduction data storage file.

Other objects, features, and advantages of the present disclosure will become apparent from a more detailed description based on embodiments of the present disclosure to be described later and accompanying drawings. Note that in the present description, the term "system" means a logical collection of a plurality of apparatus, and is not limited to the arrangement in which the apparatus are present in the same housing.

Advantageous Effects of Invention

According to the arrangement of the embodiments of the present disclosure, there is provided an arrangement capable of reliably generating and transmitting viewing information with respect to contents received via a communication route other than terrestrial broadcasting waves.

Specifically, for example, contents in which a contents ID applicable to the generation of viewing information and viewing information-compatible data such as viewing information destination information or the like are recorded in an electronic watermark (WaterMark) or a sound data file are sent from a transmitting apparatus to a receiving apparatus. The receiving apparatus acquires the contents ID and the viewing information destination information, etc. from the electronic watermark (WM) or the sound data file, generates viewing information using the acquired data, and sends the generated viewing information to a designated address.

This arrangement makes it possible to reliably generate and transmit viewing information with respect to contents received via a communication route other than terrestrial broadcasting waves.

Note that the advantages described in the present description are illustrative only, but not restrictive, and additional advantages are applicable.

BRIEF DESCRIPTION OF DRAWINGS

FIG. 1 is a diagram illustrative of a configurational example of a communication system.

FIG. 2 is a diagram illustrative of a configurational example of a communication system for carrying out a process according to the present disclosure.

FIG. 3 is a diagram illustrative of the format of a CDM (Consumption Data Message).

FIG. 4 is a diagram illustrative of transmission data of a transmitting apparatus.

FIG. 5 is a diagram illustrative of a problem in the transmission of contents via an MVPD.

FIG. 6 is a diagram illustrative of an example of a process of transmitting data for CDM generation and transmission to which an electronic watermark (WM) is applied.

FIG. 7 is a diagram illustrative of data for CDM generation and transmission to be embedded as an electronic watermark (WM) in image data.

FIG. 8 is a diagram illustrative of data for CDM generation and transmission to be embedded as an electronic watermark (WM) in image data.

FIG. 9 is a diagram illustrative of data for CDM generation and transmission to be embedded as an electronic watermark (WM) in image data.

FIG. 10 is a diagram illustrative of data for CDM generation and transmission to be embedded as an electronic watermark (WM) in image data.

FIG. 11 is a diagram illustrative of data for CDM generation and transmission to be embedded as an electronic watermark (WM) in sound data.

FIG. 12 is a diagram illustrative of data for CDM generation and transmission to be embedded as an electronic watermark (WM) in sound data.

FIG. 13 is a diagram illustrative of data for CDM generation and transmission to be embedded as an electronic watermark (WM) in sound data.

FIG. 16 is a diagram illustrative of an extended CDM format.

FIG. 17 is a diagram illustrative of the extended CDM format.

FIG. 18 is a diagram illustrative of the extended CDM format.

FIG. 25 is a diagram illustrative of an example of a process of distributing contents via a broadband communication network.

FIG. 26 is a diagram illustrative of a processing example in which an MPD is distributed together with contents distributed via a broadband communication network.

FIG. 27 is a diagram illustrative of a configurational example of an MPD.

FIG. 28 is a diagram illustrative of a configurational example of an MPD.

FIG. 29 a diagram illustrative of a configurational example of an MPD.

FIG. 33 is a diagram illustrative of a hardware configurational example of the transmitting apparatus and the receiving apparatus.

DESCRIPTION OF EMBODIMENTS

Figure 14:
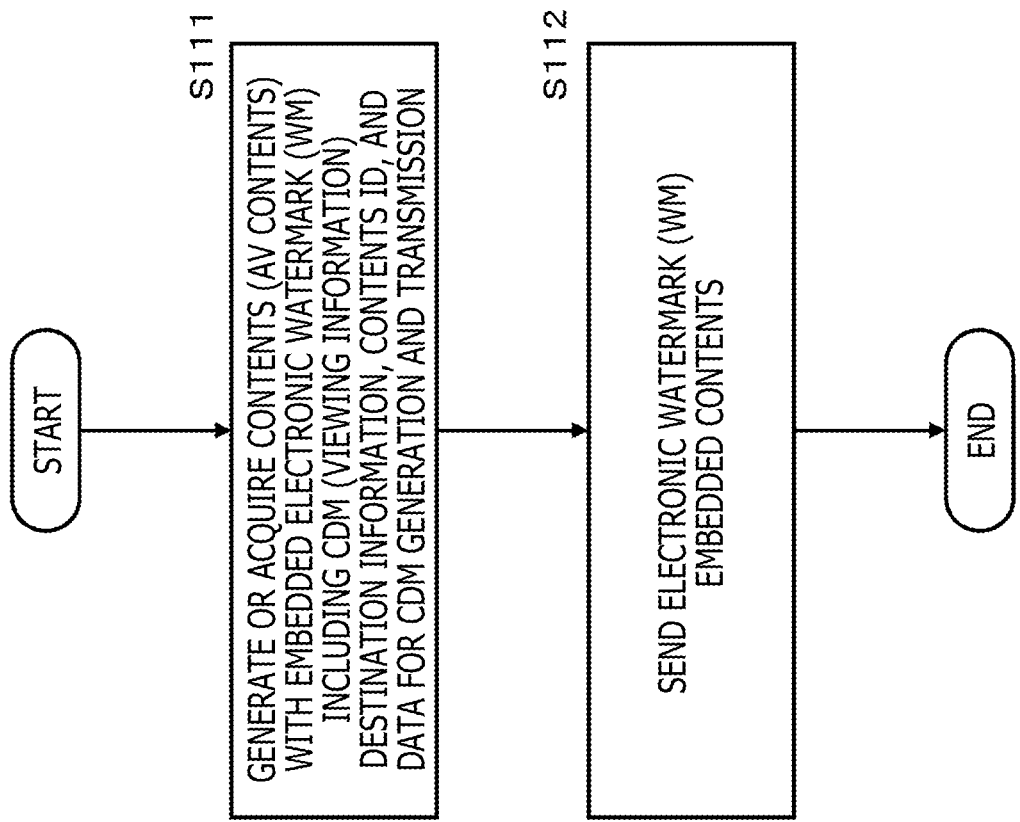
FIG. 14 is a diagram depicting a flowchart which is illustrative of a processing sequence carried out by a transmitting apparatus.

Details of a receiving apparatus, a transmitting apparatus, and a data processing method according to the present disclosure will be described below with reference to the drawings. The description will be given in the following order:

1. About a configurational example of a communication system and a CDM;

2. (Embodiment 1) About an embodiment in which an electronic watermark (WM) that has stored CDM-compatible data to be applied to a CDM generation and transmission process is embedded in image or sound data;

2-1. An example of electronic watermark (WM) information to be recorded in image data;

2-2. An example of electronic watermark (WM) information to be recorded in sound data;

3. About sequences of processes (Embodiment 1) carried out by the transmitting apparatus and the receiving apparatus;

4. About a new CDM format;

5. (Embodiment 2) About an embodiment in which CDM-compatible data to be applied to a CDM generation and transmission process are recorded in a user data recording area of compressed sound data;

6. About sequences of processes (Embodiment 2) carried out by the transmitting apparatus and the receiving apparatus;

7. (Embodiment 3) About an embodiment in which a contents ID is acquired from an MPD and a CDM is generated;

8. About sequences of processes (Embodiment 3) carried out by the transmitting apparatus and the receiving apparatus;

9. About a configurational example of the transmitting apparatus and the receiving apparatus; and 10. A summary of the arrangement of the present disclosure.

[1. About a configurational example of a communication system and a CDM]

First, a configurational example of a communication system in which a receiving apparatus, such as a TV set of each user or the like, that receives and reproduces broadcast services generates report data, i.e., a CDM (Consumption Data Message), representing a summary of viewing information relative to broadcast contents and sends the CDM to a viewing analyzing apparatus will be described below.

As described above, ATSC (Advanced Television Systems Committee)2.0 regarding standards about data distribution systems via broadcasting waves and networks in the USA and ATSC3.0 that efforts are presently made to standardize include standards about a process of collecting broadcast contents viewing records (Usage Reporting) in receiving apparatus such as TV sets or the like.

Specifically, they prescribe a procedure for a receiving apparatus, such as a TV set of each user or the like, that receives broadcast services to generate a CDM (Consumption Data Message) as report data based on viewing experiences about the broadcast services and send the generated CDM from each user's terminal (TV set or the like) to a viewing information analyzing server (Service Usage Data Server) as a viewing information analyzing apparatus, and also prescribe a CDM format.

According to the present standards, a CDM as viewing experience report data is of such a format that only a viewing situation about broadcast contents which are directly received by a receiving apparatus such as a TV set or the like via terrestrial broadcasting waves is recorded and reported.

For example, as depicted in FIG. 1, a transmitting apparatus 20 such as a broadcasting server (broadcasting station)

21 sends various broadcasting contents such as program contents, advertisement contents, etc. using terrestrial broadcasting waves.

A receiving apparatus 30 which is a user's terminal such as a TV set 31 or the like receives and reproduces broadcasting contents sent via terrestrial broadcasting waves.

At this time, the receiving apparatus 30 executes a predetermined CDM generating algorithm to generate a CDM (Consumption Data Message) file representing report data based on viewing experiences, and sends the generated CDM file to a viewing information analyzing apparatus 40, or specifically, a viewing information analyzing server (Service Usage Data Server) 40.

If the broadcast contents received by the receiving apparatus 30 are entirely data coming via only terrestrial broadcasting waves, then the viewing information analyzing apparatus 40 is able to reliably acquire and analyze viewing record information of broadcast contents in the receiving apparatus 30 by using a communication system depicted in FIG. 1.

However, in the USA, approximately 70% households receive broadcast contents from cable broadcasting organizations and satellite broadcasting organizations. In other words, only 30% of all the households receive broadcast contents directly via terrestrial wave broadcasts.

Furthermore, it is assumed that the distribution of broadcasting contents via broadband (Broadband) networks such as the Internet, etc. will increase in the future.

As depicted in FIG. 2, broadcasting contents are distributed to the receiving apparatus 30 via various communication paths such as:
 (a) terrestrial broadcasting waves;
 (b) MVPDs; and
 (c) broadband communication networks.

As described above, cable broadcasting organizations and satellite broadcasting organizations are called MVPDs (Multichannel Video Programming Distributors).

The transmitting apparatus 20 such as the broadcasting server (broadcasting station) 21 as depicted in FIG. 2 sends broadcasting contents via terrestrial broadcasting waves and also provides broadcasting contents to an MVPD 60. Moreover, the transmitting apparatus 20 provides broadcasting contents to the receiving apparatus 30 which is the user's terminal such as the TV set 31 or the like via a broadband communication network 50.

The MVPD 60 converts broadcasting contents received from a broadcasting station, for example, into a unique format of its own, e.g., encrypts or scrambles the broadcasting contents, and sends the processed broadcasting contents to a set-top box (STB) provided by the MVPD company and installed on the user's terminal such as the TV set or the like.

The STB on the user's terminal performs a data processing process according to an algorithm unique to the MVPD, e.g., a descrambling process, on the broadcast contents, and outputs the processed contents (AV contents) to the user's terminal such as the TV set or the like connected to the STB, so that the contents are reproduced on the TV set or the like.

However, as described above, the present CDM is of such a format that only the contents that the receiving apparatus has directly received as broadcasting services via terrestrial broadcasting waves are expected to be reported.

Therefore, as depicted in FIG. 2, even though broadcasting contents are distributed to the receiving apparatus 30 via various communication paths such as:
 (a) terrestrial broadcasting waves;
 (b) MVPDs; and
 (c) broadband communication networks, the viewing information analyzing apparatus 40 can receive only CDMs that reflect only viewing record information of the contents that are received and reproduced via terrestrial broadcasting waves.

In other words, the present CDM is problematic in that it fails to reflect contents viewing achieved via cables and satellite services that account for approximately 70% of all the households and viewing information on broadband communication network distributions.

The format of the present CDM will be described below with reference to FIG. 3.

As depicted in FIG. 3, the format of the present CDM has recording areas for items of information such for example as:
 (1) viewing channel number;
 (2) viewing start time; and
 (3) viewing end time.

Note that a channel number at which the receiving apparatus 30 is displaying contents may be a particular channel number set on the receiving apparatus 30, for example, and may not agree with the original broadcasting physical channel number of the contents. A channel number that is recorded in a CDM shall be a channel number that is capable of identifying contents to be viewed in the viewing information analyzing apparatus 40 depicted in FIG. 1 as a CDM destination. Such a channel number that is capable of identifying contents to be viewed is referred to as virtual channel number (Virtual Channel Number).

The receiving apparatus 30 such as the TV set or the like which is the user's terminal executes a CDM generating program stored in advance in a storage unit to generate a CDM file according to the format depicted in FIG. 3, where a receiving channel number and viewing start and end time information in the receiving apparatus 30 are recorded, and sends the generated CDM file to the viewing information analyzing apparatus 40 depicted in FIG. 1.

Note that the transmitting apparatus 20 such as the broadcasting station or the like sends contents to the receiving apparatus 30 via terrestrial broadcasting waves according to MPEG-DASH standards that are standards for an adaptive streaming technology, for example.

The MPEG-DASH standards include the following two standards:
 (a) Standards with respect to manifest files (MPD: Media Presentation Description) for describing meta data that represent management information for moving images and sound files; and
 (b) Standards with respect to a file format (segment format) for the transmission of moving image contents.

The transmitting apparatus 20 distributes contents to the receiving apparatus 30 according the above MPEG-DASH standards.

The transmitting apparatus 20 encodes contents data to generate a data file including encoded data and meta data of the encoded data. The encoding process is carried out according to an MP4 file format prescribed by MPEG, for example. In case the transmitting apparatus 20 generates a data file according to the MP4 format, a file of encoded data is called "mdat" and meta data are called "moov," "moof," or the like.

An example of transmission data of the transmitting apparatus 20 will be described below with reference to FIG. 4.

As depicted in FIG. 4, the transmitting apparatus 20 that performs data transmission according to the MPEG-DASH standards transmit a plurality of kinds of data that are roughly classified as follows:

(a) image data;

(b) sound data; and (c) signaling data (broadcasting station generated signaling (Signaling-A)).

The image data and the sound data are sent as AV segments that serve as divided data, for example. These data include image (video) data and sound (audio) data to be reproduced on the receiving apparatus 30, namely program contents provided by the broadcasting station, for example. For example, these data include MP4-encoded data (mdat) and meta data (moov, moof) described above. Note that the AV segments are also called DASH segments.

The signaling data include, for example, program schedule information such as a program guide or the like, address information (URL (Uniform Resource Locator) or the like) required for program acquisition, information required for contents reproduction, e.g., guide information including codec information (encoding process or the like), and various items of control information such as application control information or the like.

For reproducing image and sound data received via terrestrial broadcasting waves, the receiving apparatus 30 preliminarily receives signaling data via terrestrial broadcasting waves, acquires AV segments storing target contents using access information and control information recorded in the signaling data, and performs a reproducing process.

The signaling data are sent from the transmitting apparatus 20 as data according to the XML (Extensible Markup Language) format, for example.

The signaling data are repeatedly sent from time to time. For example, the signaling data are repeatedly sent frequently at intervals of 100 milliseconds, for example.

This is to allow the receiving apparatus (client) to be able to acquire signaling data immediately at any time.

The client (receiving apparatus) is able to perform, without delay, processes required to receive and reproduce program contents, such as a process of acquiring an address for accessing necessary program contents and a codec setting process, etc., on the basis of signaling data that can be received as needed.

The signaling data further include information about a destination for a CDM which represents viewing experience report data as described above, e.g., the address (URL) of the viewing information analyzing apparatus 40 depicted in FIG. 1, and signaling data where CDM-compatible data are recorded, such as channel information or the like which is data to be recorded in the CDM.

For viewing broadcast contents received via terrestrial broadcasting waves, the receiving apparatus 30 acquires CDM recording data (viewing channel information or the like) recorded in signaling data and generates a CDM according to the format described above with reference to FIG. 3, as indicated in step S11 in FIG. 4. Furthermore, the receiving apparatus 30 can send the CDM to the CDM destination information (e.g., an address such as a URL or the like) recorded in the signaling data.

However, the CDM-compatible data applied to CDM generation and transmission are recorded in signaling data sent via terrestrial broadcasting waves.

On the other hand, as described earlier with reference to FIG. 2, broadcasting contents are sent to the receiving apparatus 30 via various communication paths such as:

(a) terrestrial broadcasting waves;

(b) MVPDs; and (c) broadband communication networks.

For receiving and viewing broadcasting contents via terrestrial broadcasting waves, the receiving apparatus 30 can receive signaling data sent via terrestrial broadcasting waves and acquire CDM-compatible data including CDM destination information and CDM recording data, etc. from the received signaling data.

For reproducing contents received via an MVPD 60 or a broadband communication network 50, however, there are occasions in which the receiving apparatus 30 carries out contents reproduction without referring to signaling data sent via terrestrial broadcasting waves.

When contents received via a route other than terrestrial broadcasting waves are to be reproduced, the receiving apparatus 30 thus does not acquire channel information and CDM destination information that are needed for CDM generation which are recorded in signaling data sent via terrestrial broadcasting waves. As a result, a CDM generation and transmission process cannot be performed.

A plurality of embodiments for solving such a problem will successively be described below.

The embodiments will successively be described below:

(Embodiment 1) an embodiment in which an electronic watermark (WM) that has stored CDM-compatible data to be applied to a CDM generation and transmission process is embedded in image or sound data;

(Embodiment 2) an embodiment in which CDM-compatible data to be applied to a CDM generation and transmission process are recorded in a user data recording area of compressed sound data; and (Embodiment 3) an embodiment in which a contents ID is acquired from an MPD and a CDM is generated.

[2. (Embodiment 1) About an embodiment in which an electronic watermark (WM) that has stored CDM-compatible data to be applied to a CDM generation and transmission process is embedded in image or sound data]

Next, an embodiment in which an electronic watermark (WM) that has stored CDM-compatible data is embedded in image or sound data will be described below as Embodiment 1.

FIG. 5 is a diagram illustrative of a processing example in which the receiving apparatus 30 has received broadcasting contents via the MVPD 60.

The MVPD 60 is an MVPD (Multichannel Video Programming Distributor) such as a cable broadcasting organization or a satellite broadcasting organization.

The transmitting apparatus 20 such as a terrestrial wave broadcasting station or the like provides the MVPD 60 with contents 101 which are broadcasting contents. The MVPD 60 performs a predetermined process, e.g., a data processing process such as a scrambling process or the like, on the broadcasting contents received from the broadcasting station, for example, and sends the processed broadcasting contents to a set-top box (STB) 70 provided by the MVPD organization and installed on the receiving apparatus 30 which is the user's terminal such as the TV set or the like of the user.

The set-top box (STB) 70 installed on the receiving apparatus 30 performs a process unique to the MVPD, e.g., a descrambling process or the like, on the contents, and outputs contents (AV contents) to the receiving apparatus 30 such as the TV set or the like that is connected to the STB, so that the contents are reproduced.

As depicted in FIG. 5, the MVPD 60 receives the broadcasting contents 101 from the transmitting apparatus 20 such as the broadcasting station or the like, and sends the broadcasting contents to the set-top box (STB) 70 provided by the MVPD organization and installed on the receiving apparatus 30 which is the user's terminal such as the TV set or the like of the user.

At this time, the MVPD 60 generates signaling data (Signaling-B) unique to the MVPD, in which information for descrambling contents and control information such as program information, etc. are recorded, and sends the generated signaling data to the set-top box (STB) 70.

In step S21 depicted in FIG. 5, the set-top box (STB) 70 refers to the signaling data (Signaling-B) unique to the MVPD, performs a predetermined data processing process on the image and sound data, generates reproduction data, and outputs the generated reproduction data to the receiving apparatus 30 such as the TV set or the like.

In step S22, the receiving apparatus 30 reproduces (outputs) image/sound data 102 input from the STB 70. For example, the image/sound data 102 are input via an HDMI (registered trademark) cable or the like, for example. However, since the set-top box (STB) does not output the signaling data to the receiving apparatus 30, the receiving apparatus 30 cannot acquire CDM-compatible data such as CDM recording data (viewing channel information, etc.) and CDM destination information (e.g., an address such as a URL or the like), etc., and cannot generate and transmit a CDM.

As an embodiment for solving this problem, Embodiment 1 in which an electronic watermark (WM) that has stored CDM-compatible data to be applied to a CDM generation and transmission process is embedded in image or sound data will be described below with reference to FIG. 6 and other following figures (Embodiment 1).

FIG. 6 is a diagram illustrative of a processing example in which the receiving apparatus 30 receives broadcasting contents via the MVPD 60, as is the case with the example described with reference to FIG. 5.

The MVPD 60 is an MVPD (Multichannel Video Programming Distributor) such as a cable broadcasting organization or a satellite broadcasting organization.

The transmitting apparatus 20 such as a terrestrial wave broadcasting station or the like provides the MVPD 60 with broadcasting contents in which an electronic watermark (WM: WaterMark) is embedded, i.e., electronic watermark (WM) stored contents 121.

The broadcasting contents refer to broadcasting contents such as program contents, advertisement contents, etc., and are contents including image data and sound data.

The transmitting apparatus 20 provides the MVPD 60 with contents in which CDM-compatible data are stored as an electronic watermark (WM) in at least either image data or sound data of the contents.

Specifically, the transmitting apparatus 20 generates or acquires electronic watermark (WM) stored contents including image data or sound data in which recording data for a CDM and CDM destination information (address) are recorded as an electronic watermark, and provides the electronic watermark (WM) stored contents to the MVPD 60.

The MVPD 60 sends the electronic watermark (WM) stored contents received from the transmitting apparatus 20 such as the broadcasting station or the like, for example, to the set-top box (STB) 70 provided by the MVPD organization and installed on the receiving apparatus 30 which is the user's terminal such as the TV set or the like of the user.

The set-top box (STB) 70 installed on the receiving apparatus 30 analyzes the received data according to the signaling data unique to the MVPD, and outputs contents (AV contents) to the receiving apparatus 30 such as the TV set or the like that is connected to the STB, so that the contents are reproduced.

As depicted in FIG. 6, the MVPD 60 sends the data depicted below to the set-top box (STB) 70 provided by the MVPD organization and installed on the receiving apparatus 30 which is the user's terminal such as the TV set or the like of the user:

(a) electronic watermark (WM) stored image data;
(b) electronic watermark (WM) stored sound data; and
(c) signaling data (Signaling-B).

Note that the signaling data (Signaling-B) are signaling data unique to the MVPD that are generated by the MVPD 60, and are data capable of being processed, e.g., analyzed, by the set-top box (STB) 70 which is a device provided by the MVPD organization.

The electronic watermark (WM) may be stored in at least either the image data or the sound data.

The electronic watermark (WM) includes recording data for a CDM and data required for a CDM generation and transmission process, such as CDM destination information (address), etc., i.e., CDM-compatible data, recorded therein.

In step S31 depicted in FIG. 6, the set-top box (STB) 70 refers to the signaling data (Signaling-B) unique to the MVPD which are sent from the MVPD 60, generates electronic watermark (WM) stored contents 122 as reproduction data, and outputs the generated electronic watermark (WM) stored contents 122 to the receiving apparatus 30 such as the TV set or the like. The set-top box (STB) 70 outputs the electronic watermark (WM) stored contents 122 via an HDMI (registered trademark) cable or the like, for example.

Note that the electronic watermark (WM) stored in the image data or the sound data is data that will not be erased or changed by a scrambling process, an encrypting process, an encoding process, and a decoding process.

In other words, the contents output from the STB 70 to the receiving apparatus 30 represent electronic watermark (WM) stored contents 122 in which the CDM-compatible data required for a CDM generation and transmission process are recorded as an electronic watermark (WM).

In step S32, the receiving apparatus 30 carries out a contents reproduction (output) process where the electronic watermark (WM) stored contents 122 input from the STB 70 are applied. Furthermore, the receiving apparatus 30 carries out a process of detecting the electronic watermark (WM) from the electronic watermark (WM) stored contents 122.

The receiving apparatus 30 carries out the process of detecting the electronic watermark (WM) embedded in the image data or the sound data, acquires the CDM-compatible data recorded as the electronic watermark (WM), generates a CDM by applying the acquired CDM-compatible data, and sends the generated CDM to the viewing information analyzing apparatus.

Note that the CDM-compatible data recorded as the electronic watermark (WM) include contents information (contents ID and channel ID) of contents to be reproduced by the receiving apparatus 30 and CDM destination information (viewing information analyzing apparatus address such as a URL or the like), etc. recorded therein.

According to Embodiment 1, as described above, the receiving apparatus 30 can acquire information required for a CDM generation and transmission process from the electronic watermark (WM) stored in the image data or the sound data that make up the contents to be reproduced.

Therefore, the receiving apparatus 30 can perform a CDM generation and transmission process without referring to signaling data sent via terrestrial broadcasting waves.

In FIG. 6, the electronic watermark (WM) embedded contents have been illustrated as being sent via the MVPD 60. However, the route along which the electronic watermark (WM) embedded contents are sent is not limited to the route via the MVPD 60, but may be other routes, e.g., a route via terrestrial broadcasting waves described with reference to FIG. 2 or a route via the broadband communication network 50 such as the Internet or the like. Irrespective of which one of these routes is employed, the receiving apparatus 30 is able to acquire CDM-compatible information from the electronic watermark (WM) embedded in the contents themselves, i.e., the CDM recording data and the CDM destination information, etc.

Data configurational examples of electronic watermarks (WM) recorded in image data and sound data will be described below with reference to FIG. 7 and other following figures.

The electronic watermark (WM) information examples given below will successively be described below:

(1) an example of electronic watermark (WM) information recorded in image data (FIGS. 7 through 10); and (2) an example of electronic watermark (WM) information recorded in sound data (FIGS. 11 through 13).

[2-1. An example of electronic watermark (WM) information to be recorded in image data]

First, a data configurational example of an electronic watermark (WM) embedded in image data will be described below with reference to FIGS. 7 through 10.

FIG. 7 is a diagram depicting a data configurational example of an electronic watermark (WM) embedded in image data.

As depicted in FIG. 7, the electronic watermark (WM) embedded in image data includes a plurality of CDM-compatible data recorded therein. Specifically, for example, the following data are recorded:

(1a) contents ID information;

(1b) channel ID information; and (1c) CDM transmission address information (URI).

(1a) Contents ID information represents an identifier of contents corresponding to the image data in which the electronic watermark (WM) is embedded. For example, it represents an identifier of particular program contents or advertisement contents.

(1b) Channel ID information represents the channel number of a broadcasting station that provides contents corresponding to the image data in which the electronic watermark (WM) is embedded. Incidentally, a channel number at which the receiving apparatus 30 is displaying contents may be a particular channel number used by the MVPD, for example, and may not agree with the original broadcasting physical channel number of the contents. A channel number that is embedded as an electronic watermark shall be a channel number that is capable of identifying contents to be viewed in the viewing information analyzing apparatus 40 depicted in FIG. 1 which is a CDM destination.

Such a channel number that is capable of identifying contents to be viewed is referred to as virtual channel number (Virtual Channel Number).

(1c) CDM transmission address information (URI) refers to the address (URI) of a CDM destination to which a CDM is sent. The address, e.g., URI, of the viewing information analyzing apparatus 40 depicted in FIG. 1, is recorded therein.

A detailed configuration of (1a) contents ID information will be described below with reference to FIG. 8.

As depicted in FIG. 8, the data recorded as the contents ID information includes the following data:

ID type information; and program contents ID (EIDR) or advertisement contents ID) (adID).

The ID type information represents an area where there is recorded ID type information indicating whether a contents ID recorded in the electronic watermark is an identifier of program contents provided by a broadcasting station or an identifier of advertisement contents.

If a contents ID recorded in the electronic watermark is an identifier of program contents provided by a broadcasting station, then the type information:

ID type=EIDR is recorded.

On the other hand, if a contents ID recorded in the electronic watermark is an identifier of advertisement contents, then the type information:

ID type=adID is recorded.

Note that EIDR represents an identifier: EIDR (Entertainment Identifier Registry) prescribed as contents identification information about a movie, a program, or the like, for example.

If ID type=EIDR is recorded, then a program contents ID (EIDR) is recorded in a contents ID information recording field.

On the other hand, if ID type=adID is recorded, then an advertisement contents ID (adID) is recorded in a contents ID information recording field.

The receiving apparatus 30 acquires either contents ID, i.e., a program contents ID (EIDR) or an advertisement contents ID (adID), from the electronic watermark (WM) recorded in image data, and records the acquired contents ID in a CDM as a viewing information recording report.

Next, (1b) channel ID information and (1c) CDM transmission address information (URI) will be described below with reference to FIG. 9.

As depicted in FIG. 9 at (1b), (1b) channel ID information includes channel number information recording areas for:

major channel number information; and minor channel number information.

TV channel numbers in the USA are set as 15.42 channels or the like, for example, where 15 represents a major channel number and 42 a minor channel number.

These channel numbers are recorded.

The receiving apparatus 30 acquires these channel numbers and records them in a CDM as a viewing information recording report.

As depicted in FIG. 9 at (1c), (1c) CDM transmission address information (URI) includes:

URI type information; and

URI information recorded therein.

The URI type information represents type information recorded therein which indicates what a URI recorded as URI information belongs to.

FIG. 10 depicts a specific example of the URI type information.

A value in the range 0×00–0×FF can be set to the URI type information.

URI type=0×00 indicates that a URI recorded as URI information is a URI for accessing an AIT (Application Information Table).

URI type=0x01 indicates that a URI recorded as URI information is a URI for accessing an MPD (Media Presentation Description).

URI type=0x02 indicates that a URI recorded as URI information is a URI for accessing an ESG (Electronic Service Guide).

URI type=0x03 indicates that a URI recorded as URI information is a CDM destination URI.

Incidentally, AIT represents a table recording therein application control information required to acquire and perform applications to be executed by the receiving apparatus 30, and is provided by the transmitting apparatus 20 such as a broadcasting station or the like.

In addition, MPD represents a manifest file for describing meta data that represent management information for moving images and sound files, and is provided by the transmitting apparatus 20 such as a broadcasting station or the like.

In addition, ESG represents an electronic program table and is provided by the transmitting apparatus 20 such as a broadcasting station or the like.

URI type=0x03 indicates that a URI recorded as URI information is a CDM destination URI. In other words, this URI represents the address of the viewing information analyzing apparatus 40 depicted in FIG. 1.

The receiving apparatus 30 acquires the URI information to which URI type=0x03 is set, sets this URI as a CDM destination, and sends a generated CDM thereto.

Note that the data described with reference to FIGS. 7 through 10 are part of the CDM-compatible data recorded in the electronic watermark (WM). Other various CDM-compatible data are recorded in the electronic watermark (WM). For example, CDM transmission timing information is recorded therein. The receiving apparatus 30 sends a generated CDM to the viewing information analyzing apparatus 40 according to the CDM transmission timing information recorded in the electronic watermark (WM).

In this manner, the receiving apparatus 30 acquires CDM generating information, CDM destination information, the CDM transmission timing information, etc. from the electronic watermark (WM) embedded in image data that make up program contents that are contents to be reproduced or advertisement contents, so that the receiving apparatus 30 can generate a CDM in which sufficient data required for a viewing information analysis are recorded and send the CDM to the given destination at the optimum timing.

[2-2. An example of electronic watermark (WM) information to be recorded in sound data]

Next, a data example of an electronic watermark (WM) embedded in sound data will be described below with reference to FIGS. 11 through 13.

FIG. 11 is a diagram depicting a data example of an electronic watermark (WM) embedded in sound data.

As depicted in FIG. 11, the electronic watermark (WM) embedded in sound data includes a plurality of CDM-compatible data recorded therein. Specifically, for example, the following data are recorded:

(2a) channel ID information;
(2b) trigger information; and
(2c) contents ID information.

(2a) Channel ID information represents the channel number of a broadcasting station which is providing contents corresponding to the sound data in which the electronic watermark (WM) is embedded. Incidentally, a channel number at which the receiving apparatus 30 is displaying contents may be a particular channel number used by the MVPD, for example, and may not agree with the original broadcasting physical channel number of the contents. A channel number that is embedded as an electronic watermark shall be a channel number that is capable of identifying contents to be viewed in the viewing information analyzing apparatus 40 depicted in FIG. 1 which is a CDM destination.

(2b) Trigger information corresponds to the CDM transmission address information (URI) in the electronic watermark data embedded in the image data described above with reference to FIGS. 7 and 8. In other words, the address (URI) of a CDM destination to which a CDM is sent is recorded therein. The address, e.g., the URI, of the viewing information analyzing apparatus 40 depicted in FIG. 1 is recorded therein.

(2c) Contents ID information represents an identifier of contents corresponding to the sound data in which the electronic watermark (WM) is embedded. For example, it represents an identifier of particular program contents or advertisement contents.

(2a) Channel ID information includes, as depicted in FIG. 11, channel number information recording areas for:
major channel number information; and
minor channel number information.

As described above, TV channel numbers in the USA are set as 15.42 channels or the like, for example, where 15 represents a major channel number and 42 a minor channel number.

These channel numbers are recorded.

The receiving apparatus 30 acquires these channel numbers and records them in a CDM as a viewing information recording report.

A detailed configuration of (2b) trigger information will be described below with reference to FIG. 12.

As depicted in FIG. 12, trigger information includes:
trigger information (=URI recording area); and
URI type information
recorded therein.

The URI type information represents type information recorded therein which indicates what a URI recorded as trigger information belongs to.

FIG. 12 depicts a specific example of the URI type information.

A setting value as the URI type information is either of the following values:
AIT;
MPD;
ESG;
CDM; and
others.

URI type=AIT indicates that a URI recorded as trigger information is a URI for accessing an AIT (Application Information Table).

URI type=MPD indicates that a URI recorded as trigger information is a URI for accessing an MPD (Media Presentation Description).

URI type=ESG indicates that a URI recorded as trigger information is a URI for accessing an ESG (Electronic Service Guide).

URI type=CDM indicates that a URI recorded as trigger information is a CDM destination URI.

Incidentally, as described above, AIT represents a table recording therein application control information required to acquire and perform applications to be executed by the receiving apparatus 30, and is provided by the transmitting apparatus 20 such as a broadcasting station or the like.

In addition, MPD represents a manifest file for describing meta data that represent management information for moving images and sound files, and is provided by the transmitting apparatus 20 such as a broadcasting station or the like.

In addition, ESG represents an electronic program table and is provided by the transmitting apparatus 20 such as a broadcasting station or the like.

URI type=CDM indicates that a URI recorded as trigger information is a CDM destination URI. In other words, this URI represents the address of the viewing information analyzing apparatus 40 depicted in FIG. 1.

The receiving apparatus 30 acquires the URI information recorded in the trigger information that is recorded in connection with the URI type=CDM, sets the URI as a CDM destination, and sends a generated CDM thereto.

A detailed configuration of (2c) contents ID information will be described below with reference to FIG. 13.

As depicted in FIG. 13, the data recorded as the contents ID information includes the following data:

ID type; and
contents ID (EIDR or adID).

The ID type information represents an area where there is recorded ID type information indicating whether a contents ID recorded in the electronic watermark is an identifier of program contents provided by a broadcasting station or an identifier of advertisement contents.

If a contents ID recorded in the electronic watermark is an identifier of program contents provided by a broadcasting station, then the type information:

ID type=EIDR
is recorded.

If a contents ID recorded in the electronic watermark is an identifier of advertisement contents, then the type information:

ID type=adID
is recorded.

Note that EIDR represents an identifier: EIDR (Entertainment Identifier Registry) prescribed as contents identification information about a movie, a program, or the like, for example.

If ID type=EIDR is recorded, then a program contents ID (EIDR) is recorded in a contents ID recording field.

On the other hand, if ID type=adID is recorded, then an advertisement contents ID (adID) is recorded in a contents ID recording field.

The receiving apparatus 30 acquires either recorded contents ID, i.e., a program contents ID (EIDR) or an advertisement contents ID (adID), and records the acquired contents ID in a CDM as a viewing information recording report.

Note that the data described with reference to FIGS. 11 through 13 are part of the CDM-compatible data recorded in the electronic watermark (WM). Other various CDM-compatible data are recorded in the electronic watermark (WM). For example, CDM transmission timing information is recorded therein. The receiving apparatus 30 sends a generated CDM to the viewing information analyzing apparatus 40 according to the CDM transmission timing information recorded in the electronic watermark (WM).

In this manner, the receiving apparatus 30 acquires CDM generating information, CDM destination information, the CDM transmission timing information, etc. from the electronic watermark (WM) embedded in sound data that make up program contents that are contents to be reproduced or advertisement contents, so that the receiving apparatus 30 can generate a CDM in which sufficient data required for a viewing information analysis are recorded and send the CDM to the given destination at the optimum timing.

[3. About sequences of processes (Embodiment 1) carried out by the transmitting apparatus and the receiving apparatus]

Next, sequences of processes carried out by the transmitting apparatus and the receiving apparatus will be described below with reference to flowcharts depicted in FIGS. 14 and 15.

First, the sequence of the process carried out by the transmitting apparatus will be described below with reference to the flowchart depicted in FIG. 14.

Note that the transmitting apparatus that carries out the process according to the flowchart depicted in FIG. 14 is the transmitting apparatus 20 depicted in FIG. 6, for example, and the transmitting apparatus 20 such as a broadcasting station or the like.

The transmitting apparatus 20 has programs for causing the process according to the flowchart depicted in FIG. 14 to be performed, stored in a storage unit, for example, and executes the programs with a data processor having a CPU that has a program executing function.

The processing of each of the steps of the flow depicted in FIG. 14 will be described below.

(Step S111)

First, the data processor of the transmitting apparatus generates or acquires contents (AV contents) in which there is embedded an electronic watermark (WM) including CDM (viewing information) destination information, a contents ID, and CDM generation and transmission data, etc. in step S111.

Specifically, the data processor carries out a process of generating or acquiring contents that include at least either of image data in which the electronic watermark information described with reference to FIGS. 7 through 10 is embedded and sound data in which the electronic watermark information described with reference to FIGS. 11 through 13 is embedded, for example.

(Step S112) Next, in step S112, the data processor of the transmitting apparatus sends the electronic watermark embedded contents generated in step S111.

Incidentally, as described above, the contents transmission route is not limited to the route to the receiving apparatus 30 via the MVPD 60, but may be either of other routes, e.g., a route via terrestrial broadcasting waves and a route via the broadband communication network such as the Internet or the like.

Next, the sequence of the process carried out by the receiving apparatus for receiving electronic watermark embedded contents and generating and transmitting a CDM will be described below with reference to the flowchart depicted in FIG. 15.

Figure 15:
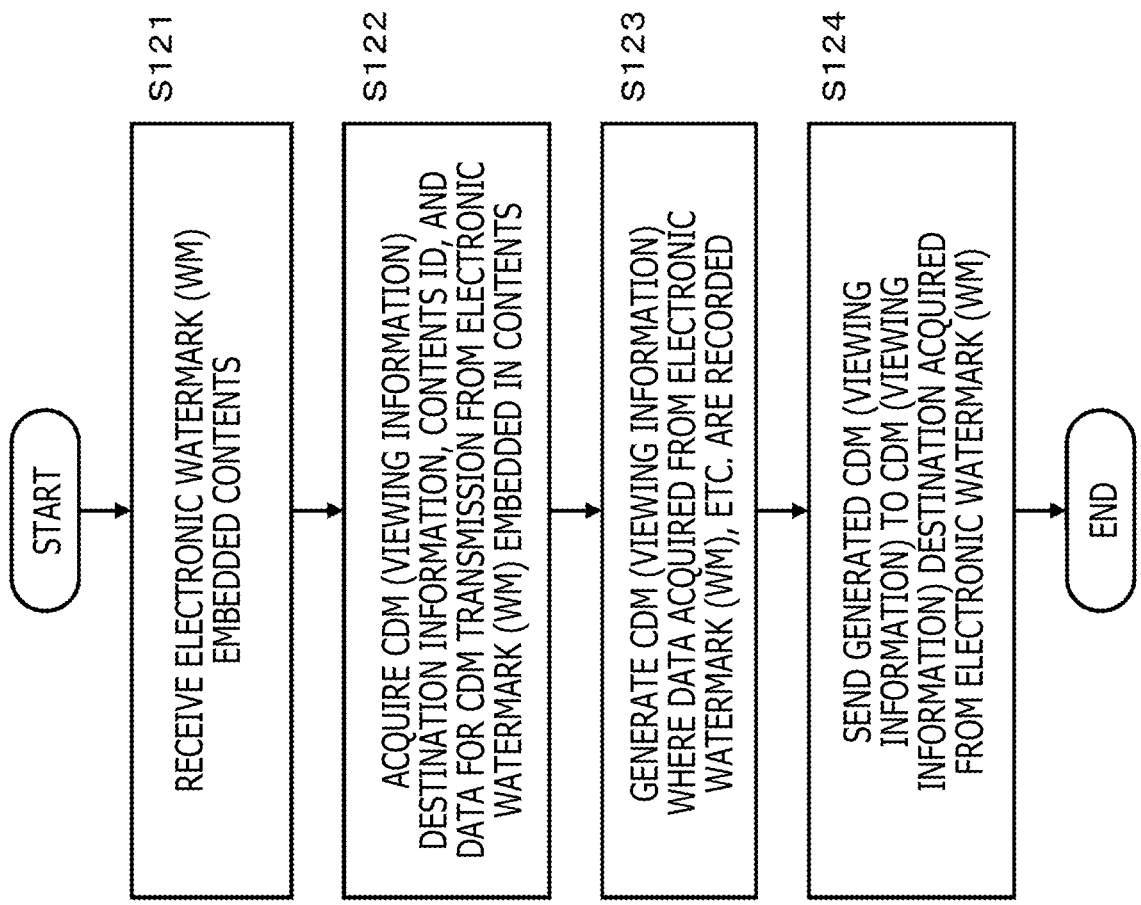
FIG. 15 is a diagram depicting a flowchart which is illustrative of a processing sequence carried out by a receiving apparatus.

Note that the receiving apparatus that carries out the process according to the flowchart depicted in FIG. 15 is the receiving apparatus 30 depicted in FIG. 6, for example.

The receiving apparatus 30 has programs for causing the process according to the flowchart depicted in FIG. 15 to be performed, stored in a storage unit, for example, and executes the programs with a data processor having a CPU that has a program executing function.

The processing of each of the steps of the flow depicted in FIG. 15 will be described below.

(Step S121)

In step S121, the receiving apparatus receives contents (AV contents) with an embedded electronic watermark (WM) including CDM (viewing information) destination information, a contents ID, and CDM generation and transmission data, etc.

As described above, the contents reception route is not limited to the route via the MVPD 60, but may be either of a route via terrestrial broadcasting waves and a route via the broadband communication network such as the Internet or the like.

(Step S122)

Next, in step S122, the data processor of the receiving apparatus acquires the CDM destination information, the contents ID, and the CDM generation and transmission data from the electronic watermark (WM) embedded in the contents.

At least either of image data and sound data of the received contents include the CDM-compatible data described above with reference to FIGS. 7 through 13, i.e., the CDM destination information, the contents ID, and the data required for a CDM generation and transmission process, recorded therein. The data processor of the receiving apparatus acquires these CDM-compatible data from the electronic watermark.

(Step S123)

Next, in step S123, the data processor of the receiving apparatus generates a CDM using the acquired data from the electronic watermark (WM).

The CDM generated by the receiving apparatus should preferably be a CDM according to a new extended format changed according to the present embodiment, based on the basic CDM format described earlier with reference to FIG. 3, for example.

The extended format for CDMs which is optimum for the present embodiment will be described in detail in the next item [4. About a new CDM format] to be described.

(Step S124)

Next, in step S124, the data processor of the receiving apparatus sends the CDM generated in step S123 to an address represented by the CDM destination information acquired from the electronic watermark (WM), i.e., the address (URL) information of the viewing information analyzing apparatus 40 depicted in FIG. 1.

Incidentally, providing CDM transmission timing information is acquired from the electronic watermark (WM), a CDM transmission timing is determined according to the CDM transmission timing information, and the transmission process is carried out.

In this manner, the receiving apparatus 30 is able to acquire CDM-compatible data required for a CDM generation and transmission process from the electronic watermark (WM) embedded in the image data or the sound data, generate a CDM by referring to the CDM-compatible data, and send the generated CDM to the viewing information analyzing apparatus.

[4. About a new CDM format]

The format of the present CDM has been described earlier with reference to FIG. 3.

As depicted in FIG. 3, the format of the present CDM has recording areas for items of information such for example as:

(1) viewing channel number;
(2) viewing start time; and
(3) viewing end time.

The CDM format depicted in FIG. 3 is for a CDM for recording viewing information based on contents viewed by receiving terrestrial broadcasting waves.

The CDM format depicted in FIG. 3 has such a setting that a viewing channel number is recorded as information for identifying the contents viewed on the receiving apparatus 30.

However, if the MVPD 60 described in Embodiment 1 provides broadcasting contents via cable TV (CATV) or the like, for example, then the channel setting is a setting unique to the MVPD organization. Furthermore, the setting channel information unique to the MVPD organization is not input from the set-top box (STB) 70 to the receiving apparatus 30 such as a TV set or the like.

Therefore, even if the setting channel information of the receiving apparatus 30 is recorded in the conventional CDM depicted in FIG. 3, there is a possibility that it may not be clear what contents correspond to the channel.

A new CDM format that will solve such a problem will be described below with reference to FIGS. 16 through 18.

FIG. 16 depicts part of (1) the present CDM format depicted in FIG. 3 and part of (2) an extended format.

As depicted in FIG. 16, the viewing channel number recording area of (1) the present CDM format is changed.

According to (2) the extended CDM format, the viewing channel number recording area of (1) the present CDM format is extended into an area for recording the following data:

(a) service source information;
(b) contents ID information; and
(c) contents ID type information.

The data represent these items of information.

The extended area is capable of recording these items of information therein.

(a) The service source information represents information recorded as indicating the reception route of the contents received and reproduced by the receiving apparatus 30.

(b) The contents ID information represents a contents ID recorded as an identifier of the contents received and reproduced by the receiving apparatus 30.

(c) The contents ID type information represents a contents ID recorded as indicating the type of a contents ID recorded in a contents ID information recording field.

(a) A specific recorded example of the service source information will be described below with reference to FIG. 17.

As depicted in FIG. 17, either of setting values 1 to 5 is recorded as a setting value of a service source ID. Each setting value indicates that the viewing information recorded in the CDM is viewing information relative to contents received via either of the following routes:

Service source setting value=1: contents via terrestrial broadcasting waves;

Service source setting value=2: contents via a broadband communication network;

Service source setting value=3: hybrid contents;

Service source setting value=4: other contents (via an MVPD such as CATV, satellite broadcasting, or the like); and Service source setting value=5: reserved.

For example, a CDM where [1] is set as a service source setting value represents a CDM where the viewing information recorded in the CDM is viewing information relative to contents received via terrestrial broadcasting waves.

A CDM where [2] is set as a service source setting value represents a CDM where the viewing information recorded in the CDM is viewing information relative to contents received via a broadband communication network such as the Internet.

A CDM where [3] is set as a service source setting value represents a CDM where the viewing information recorded in the CDM is viewing information relative to a plurality of contents received via two or more routes of terrestrial broadcasting waves, a broadband communication network, and an MVPD.

A CDM where [4] is set as a service source setting value represents a CDM where the viewing information recorded in the CDM is viewing information relative to contents received via an MVPD such as CATV, satellite broadcasting, or the like.

The viewing information analyzing apparatus 40 is able to determine the reception route of the contents viewed on the receiving apparatus 30 on the basis of the service source information recorded in the CDM.

Incidentally, the receiving apparatus 30 carries out a process of determining the contents reception route in the receiving apparatus 30 and records service source information obtained from the result of the route determining process in the CDM.

The following data are indicated as new recorded information in the extended CDM format depicted in FIG. 16:
 (b) contents ID information; and
 (c) contents ID type information.

These data are recorded using the data recorded in the electronic watermark (WM) embedded in the image data or sound data described earlier with reference to FIGS. 7 through 13, for example.

(b) The contents ID information includes, for example, a program contents ID (EIDR), an advertisement contents ID) (adID), or a channel number (Virtual Channel Number) recorded therein.

The channel number (Virtual Channel Number) can be recorded because of a setting that the extended CDM format is also applicable to a CDM that is generated when contents are viewed by receiving terrestrial broadcasting waves.

Incidentally, the recorded channel number is a virtual channel number (Virtual Channel Number). The virtual channel number (Virtual Channel Number) is a channel number capable of identifying a broadcasting station, rather than a broadcasting physical channel number of contents, as described above.

Incidentally, the major channel number and the minor channel number as data recorded in the electronic watermark (WM) described earlier with reference to FIGS. 7 through 13 correspond to a virtual channel number (Virtual Channel Number).

(c) The contents ID type information includes ID type information, recorded therein, of a contents ID recorded as (b) the contents ID information. Specific examples will be described below with reference to FIG. 18.

Setting values of contents ID type information and meanings of IDs recorded in the contents ID information recording field are associated with each other as follows:

Setting value=1: the ID recorded in the contents ID information recording field indicates a channel number (Virtual Channel Number);

Setting value=2: the ID recorded in the contents ID information recording field indicates a program identifier (EIDR);

Setting value=3: the ID recorded in the contents ID information recording field indicates an advertisement identifier (ad-ID); and Setting value=4: reserved.

As described above with reference to FIGS. 16 through 18,
 according to (2) the extended CDM format, the viewing channel number recording area of (1) the present CDM format is extended into an area for recording the following data:

(a) service source information;
 (b) contents ID information; and
 (c) contents ID type information.

The data represent these items of information.

With these items of information being recordable, it is possible to generate a CDM that makes viewed contents reliably identifiable even when contents received via a route other than terrestrial broadcasting waves are viewed on the receiving apparatus 30.

Furthermore, as the contents reception route can be determined in the receiving apparatus 30, the extended CDM format allows more detailed viewing information to be acquired than the CDM format thus far.

[5. (Embodiment 2) About an embodiment in which CDM-compatible data to be applied to a CDM generation and transmission process are recorded in a user data recording area of compressed sound data]

Next, as Embodiment 2, an embodiment in which CDM-compatible data to be applied to a CDM generation and transmission process are recorded in a user data recording area of compressed sound data will be described below.

As described above with reference to FIG. 5, in case the receiving apparatus 30 receives and reproduces contents from an MVPD (Multichannel Video Programming Distributor) 60 such as a cable broadcasting organization or a satellite broadcasting organization, the receiving apparatus 30 cannot acquire a channel number and CDM destination information, etc. recorded in signaling data received via terrestrial broadcasting waves, and cannot generate and transmit a CDM.

To solve this problem, according to (Embodiment 1) described above, CDM-compatible data for making it possible to perform a CDM generation and transmission process are embedded as an electronic watermark (WM) in image or sound data.

According to Embodiment 2 to be described below, CDM-compatible data for making it possible to perform a CDM generation and transmission process are stored in a user data recording area of compressed sound data, rather than an electronic watermark (WM).

A processing sequence of Embodiment 2 will be described below with reference to FIG. 19.

Figure 19:
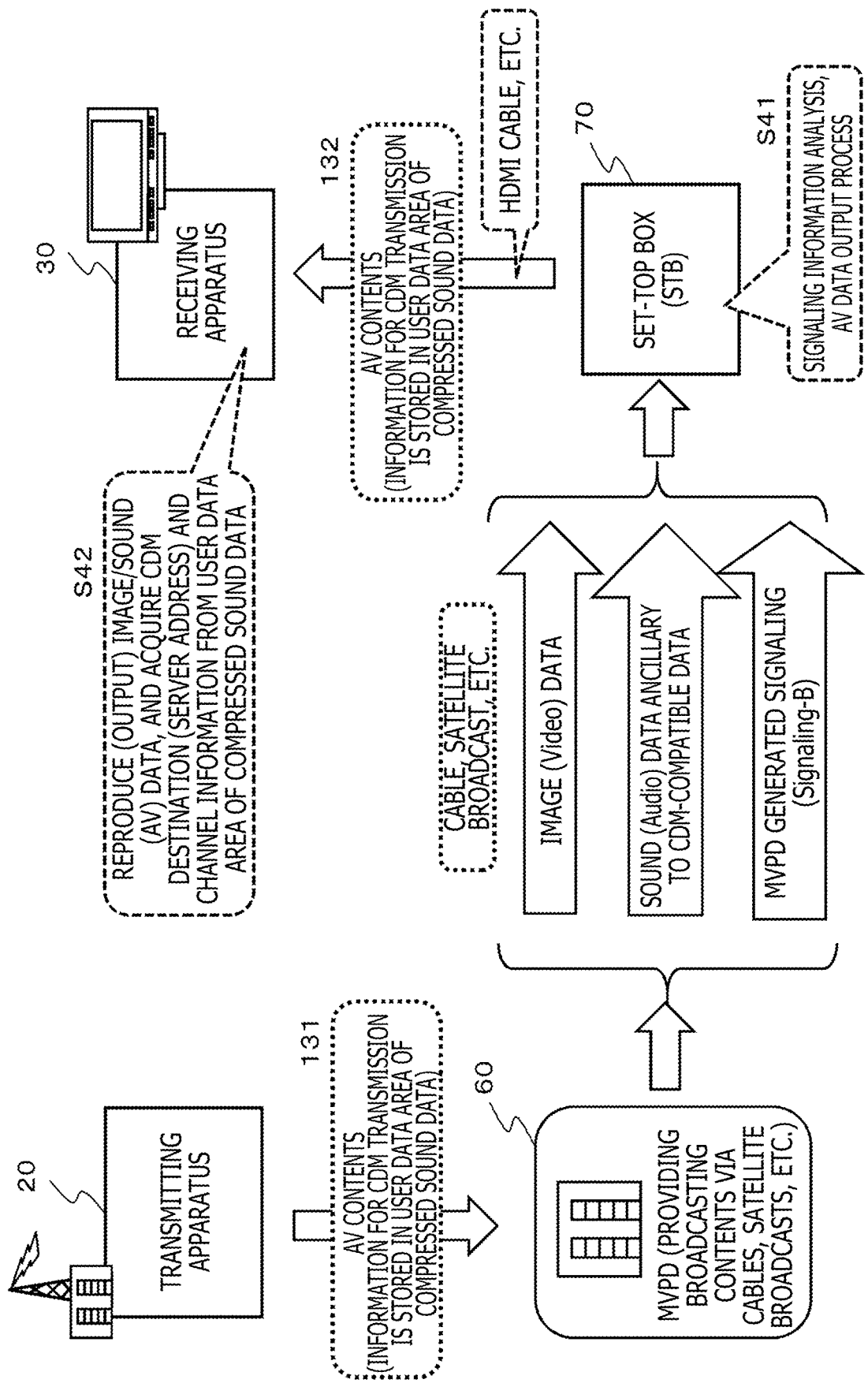
FIG. 19 is a diagram illustrative of a processing example in which data for CDM generation and transmission are recorded in a user data recording area of compressed sound data and transmitted.

FIG. 19 is a diagram illustrative of a processing example in which the receiving apparatus 30 receives broadcasting contents via the MVPD 60, as is the case with the example described with reference to FIG. 6 according to Embodiment 1.

The MVPD 60 is an MVPD (Multichannel Video Programming Distributor) such as a cable broadcasting organization or a satellite broadcasting organization.

The transmitting apparatus 20 such as a terrestrial wave broadcasting station or the like provides the MVPD 60 with broadcasting contents, i.e., AV contents 131 that are broadcasting contents including image data and sound data.

The image data and the sound data included in the AV contents 131 are encoded data, e.g., encoded data of MP4 format.

The transmitting apparatus 20 encodes broadcasting contents data to generate a data file including encoded data and meta data of the encoded data. As described earlier, the encoding process is carried out according to an MP4 file format prescribed by MPEG, for example. In case the transmitting apparatus 20 generates a data file according to the MP4 format, a file of encoded data is called "mdat" and meta data are called "moov," "moof," or the like.

An outline of the MP4 file format will be described below with reference to FIGS. 20 and 21.

Figure 20:
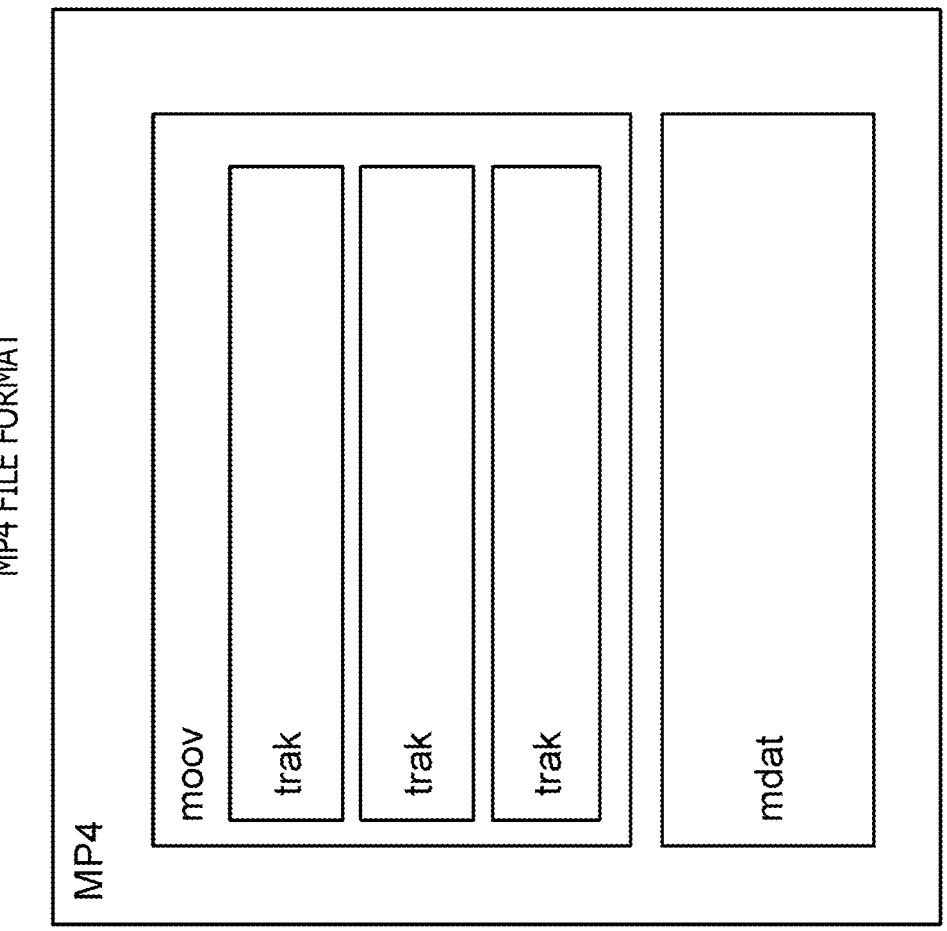
FIG. 20 is a diagram illustrative of an MP4 file format.

FIG. 20 depicts an example of the MP4 file format stipulated by ISO/IEC14496-12.

An MP4 file depicted in FIG. 20 is a file set as a single processing unit in a process of recording or reproducing data according to the MP4 file format.

The MP4 file has areas set as units of boxes, and each box stores data defined per box.

Each box has areas of a box size (box-size), a box type (box-type), and a box data (box-data).

The box size (box-size) has the data length (byte size) of a box, recorded therein.

The box type (box-type) has the kind of data stored in a box, recorded therein.

The box data (box-data) has data of a kind indicated by a box type, recorded therein.

The MP4 file depicted in FIG. 20 has boxes of the following types, set therein:
moov box;
trak box; and
mdat box.

The above boxes are set in the MP4 file.

Actual data which are data to be reproduced, such as image, sound, subtitle, etc. are stored in the mdat box.

Further, meta data such as attribute information, reproduction control information, etc. with respect to the data stored in the mdat box are stored in the trak box.

The moov box is a box set as a storage area for meta data (reproduction control information and attribute information) of data stored in the mdat box of the MP4 file.

One or more trak boxes are set in the moov box. Trak boxes can be set for data kinds such as image, sound, subtitle, etc., for example, and store meta data of respective data.

An example of a data storage configuration of the MP4 file will be described below with reference to FIG. 21. As described above, the following boxes are set in an MP4 file:
moov box;
trak box; and
mdat box.

The above boxes are set.

The mdat box stores the data of
(a) image,
(b) sound, and
(c) subtitle
therein, for example.

The data stored in the mdat box which is a data area of the MP4 file format is divided into samples (sample) each as a basic data unit.

One mdat box stores a set of data samples of either one kind, namely a set of only image samples, a set of only sound samples, or a set of only subtitle samples.

The moov box is a storage area for meta data (reproduction control information and attribute information) of data stored in the mdat box of the MP4 file.

One or more trak boxes are set in the moov box. Trak boxes can be set for data kinds such as image, sound, subtitle, etc., for example, and store meta data of respective data.

Figure 21:
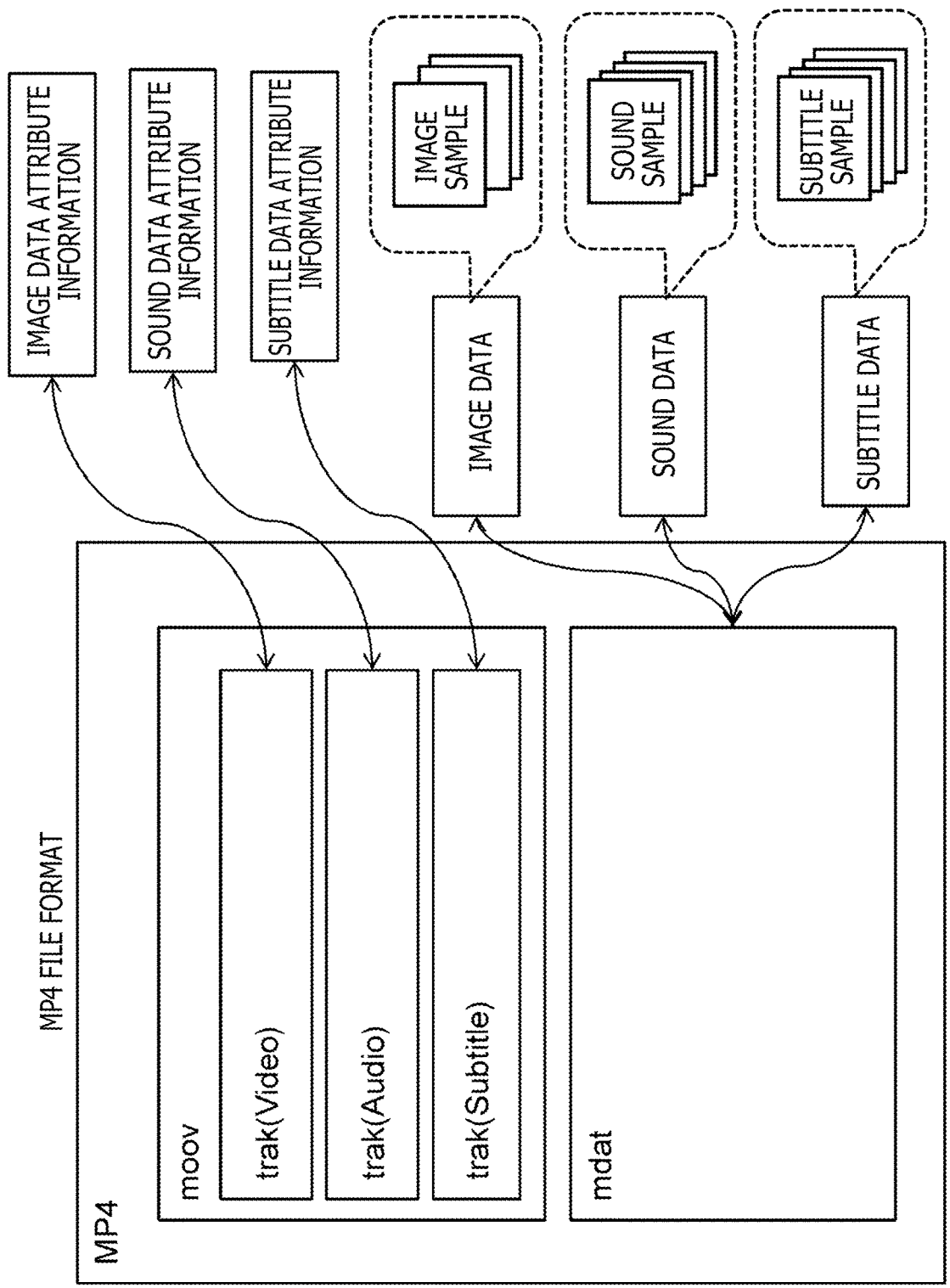
FIG. 21 is a diagram illustrative of an MP4 file format.

The trak (Video) box depicted in FIG. 21 is an image-compatible meta data storage box storing attribute information and control information about image data.

The trak (Audio) box is an image-compatible meta data storage box storing attribute information and control information about sound data.

The trak (Subtitle) box is an image-compatible meta data storage box storing attribute information and control information about subtitle data.

According to Embodiment 2, CDM-compatible data for making it possible to perform a CDM generation and transmission process are stored in a user data recording area configured in compressed sound data.

Specifically, CDM-compatible data applicable to a CDM generation and transmission process are stored in sound samples where the compressed sound data stored in the mdat box depicted in FIG. 21 are stored, for example, or a user data recording area set parallel to sound samples.

For example, there is a possibility that the MVPD 60 depicted in FIG. 19 may acquire data (image, sound, subtitle) to be reproduced from an MP4 file received from the transmitting apparatus 20 such as a broadcasting station or the like and send only these data to be reproduced to the set-top box (STB) 70. In other words, there is a possibility that the MVPD 60 may not perform a process of transmitting MP4 file units, but may send only data to be reproduced according to another data transfer format. In this case, there is a possibility that meta data stored in the MP4 file may not be sent.

Even in this case, compressed sound data are sent to the receiving apparatus 30 such as a TV set or the like via the set-top box (STB) 70. Therefore, the CDM-compatible data recorded in the user data recording area set in the compressed sound data are reliably acquired by the receiving apparatus 30 such as a TV set or the like via the set-top box (STB) 70.

The receiving apparatus 30 such as a TV set or the like can acquire the CDM-compatible data recorded in the user data recording area set in the compressed sound data, generate a CDM by applying the acquired CDM-compatible data, and send the generated CDM to the viewing information analyzing apparatus.

Note that the CDM-compatible data include contents information (contents ID and channel ID) of AV contents to be reproduced by the receiving apparatus 30, CDM destination information (viewing information analyzing apparatus address such as a URL or the like), CDM transmission timing information, etc. recorded therein.

Specifically, the similar CDM-compatible data to the CDM-compatible data recorded in the electronic watermark (WM) de scribed earlier with reference to FIGS. 7 through 13, for example, are recorded.

Furthermore, if the MVPD 60 depicted in FIG. 19 sends the MP4 file received from the transmitting apparatus 20 such as a broadcasting station or the like, as it is to the set-top box (STP) 70, and the set-top box (STP) 70 outputs the MP4 file to the receiving apparatus 30 such as a TV set or the like, then the CDM-compatible data may be recorded in a meta data storage area of the MP4 file.

Figure 22:
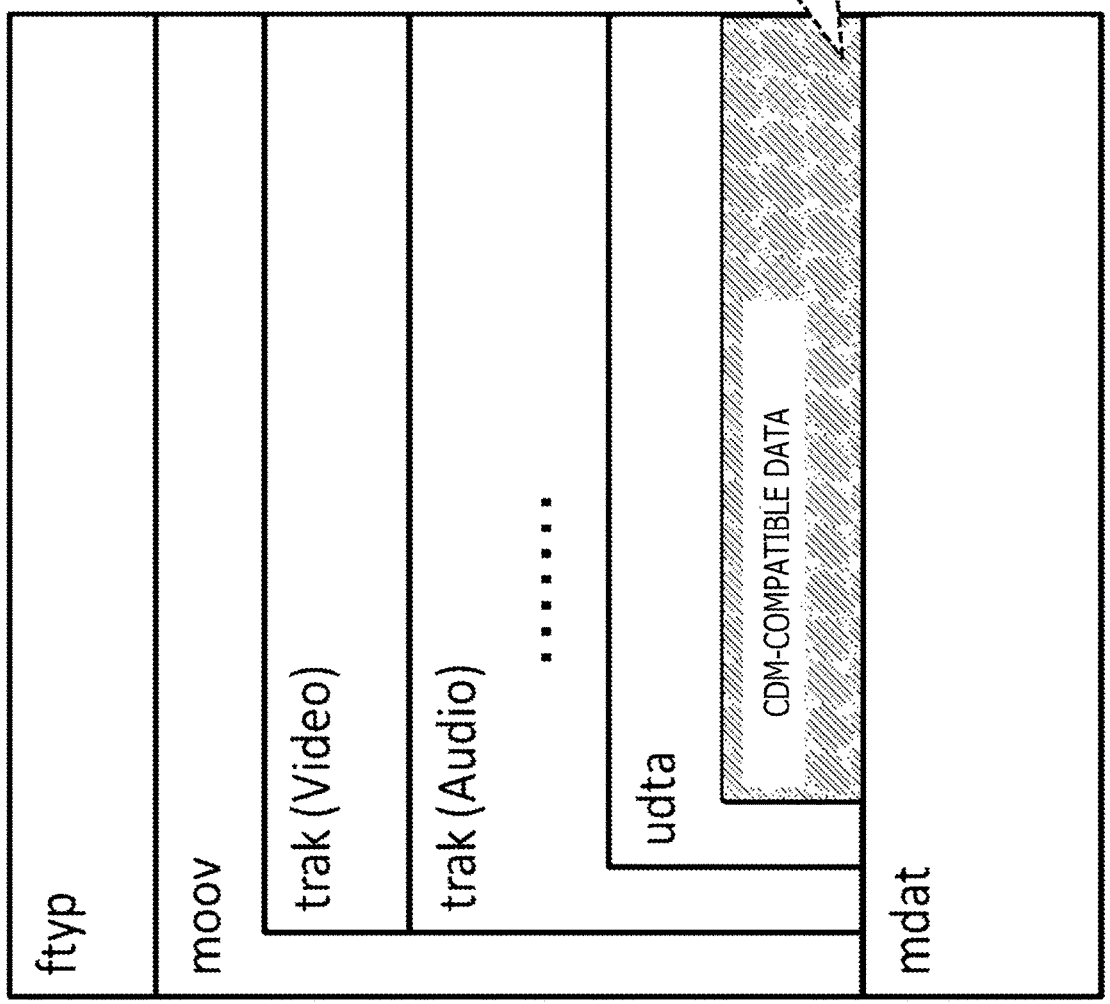
FIG. 22 is a diagram illustrative of a configurational example in which data for CDM generation and transmission are recorded in a user data recording area of compressed sound data.

FIG. 22 depicts an example in which the CDM-compatible data are stored in the meta data storage area of the MP4 file.

In the example depicted in FIG. 22, a CDM-compatible data recording box for recording information applied to a CDM generation and transmission process is set in the user data recording area of the MP4 file, i.e., a low-level box in a user data (udta) box that stores user data in the trak box that serves as a sound control information storage box.

According to Embodiment 2, as described above, the CDM-compatible data applied to the CDM generation and transmission process are recorded in the user data recording area compatible with the compressed sound data.

The transmitting apparatus 20 depicted in FIG. 19 provides the MVPD 60 with the AV contents 131 in which the CDM-compatible data are recorded in the user data recording area of the compressed sound data which are the encoded data of the sound data that make up the broadcasting contents.

Specifically, the transmitting apparatus 20 generates or acquires the AV contents 131 in which recording data for a CDM and CDM destination information (address) are recorded in the user data recording area of the compressed sound data, and provides the AV contents 131 to the MVPD 60.

The MVPD 60 sends the AV contents 131 received from the transmitting apparatus 20 such as a broadcasting station or the like to the set-top box (STB) 70 provided by the MVPD organization and installed on the receiving apparatus 30 which is the user's terminal such as the TV set or the like of the user.

The set-top box (STB) 70 installed on the receiving apparatus 30 analyzes the received data according to the signaling data unique to the MVPD, and outputs contents (AV contents) to the receiving apparatus 30 such as the TV set or the like that is connected to the STB, so that the contents are reproduced.

As depicted in FIG. 19, the MVPD 60 sends the data below to the set-top box (STB) 70 provided by the MVPD organization and installed on the receiving apparatus 30 which is the user's terminal such as the TV set or the like of the user:

(a) image data;
(b) sound data ancillary to CDM-compatible data; and
(c) signaling data (Signaling-B).

Note that the signaling data (Signaling-B) are signaling data unique to the MVPD that are generated by the MVPD 60, and are data capable of being processed, e.g., analyzed, by the set-top box (STB) 70 which is a device provided by the MVPD organization.

To the sound data, there are added recording data for a CDM and data required for a CDM generation and transmission process such as CDM destination information (address) or the like, i.e., CDM-compatible data.

The set-top box (STB) 70 performs, in step S41 depicted in FIG. 6, a predetermined data processing process, e.g., a descrambling process or the like, by referring to the signaling data (Signaling-B) unique to the MVPD that are sent from the MVPD 60, to acquire the AV contents 131 as reproduction data, and outputs the AV contents 131 to the receiving apparatus 30 such as the TV set or the like.

Note that the CDM-compatible data required for CDM generation and transmission are stored in the user data recording area of the sound data that are output from the set-top box 70 to the receiving apparatus 30.

The receiving apparatus 30 carries out a contents reproduction (output) process where the AV contents 132 input from the STB 70 via an HDMI (registered trademark) cable or the like are applied in step S42. Moreover, the receiving apparatus 30 carries out a process of acquiring the CDM-compatible data from the user data recording area of the encoded sound data.

Specifically, the receiving apparatus 30 acquires the CDM-compatible data applicable to CDM generation and transmission, recorded in the user data recording area in the file where the sound data are stored, generates a CDM by applying the acquired CDM-compatible data, and sends the generated CDM to the viewing information analyzing apparatus.

Note that the CDM-compatible data include contents information (contents ID and channel ID) of AV contents to be reproduced by the receiving apparatus 30, CDM destination information (viewing information analyzing apparatus address such as a URL or the like), CDM transmission timing information, etc. recorded therein.

Specifically, the similar CDM-compatible data to the CDM-compatible data recorded in the electronic watermark (WM) described earlier with reference to FIGS. 7 through 13, for example, are recorded.

According to Embodiment 2, as described above, it is possible for the receiving apparatus 30 to acquire information necessary for a CDM generation and transmission process from the file where the sound data that make up the contents to be reproduced are stored.

Therefore, the CDM generation and transmission process can be carried out without referring to signaling data sent via terrestrial broadcasting waves.

In FIG. 19, the CDM-compatible data have been illustrated as being additionally recorded in the compression-encoded sound data and the contents have been illustrated as being sent via the MVPD 60. However, the route along which the contents are sent is not limited to the route via the MVPD 60, but may be other routes, e.g., a route via terrestrial broadcasting waves described with reference to FIG. 2 or a route via the broadband communication network such as the Internet or the like. Irrespective of which one of these routes is employed, the receiving apparatus 30 is able to acquire CDM-compatible information from the user data recording area in the compressed sound storage file, i.e., the CDM recording data and the CDM destination information, etc.

[6. About sequences of processes (Embodiment 2) carried out by the transmitting apparatus and the receiving apparatus]

Next, sequences of processes carried out by the transmitting apparatus and the receiving apparatus will be described below with reference to flowcharts depicted in FIGS. 23 and 24.

First, the sequence of the process carried out by the transmitting apparatus will be described below with reference to the flowchart depicted in FIG. 23.

Figure 23:
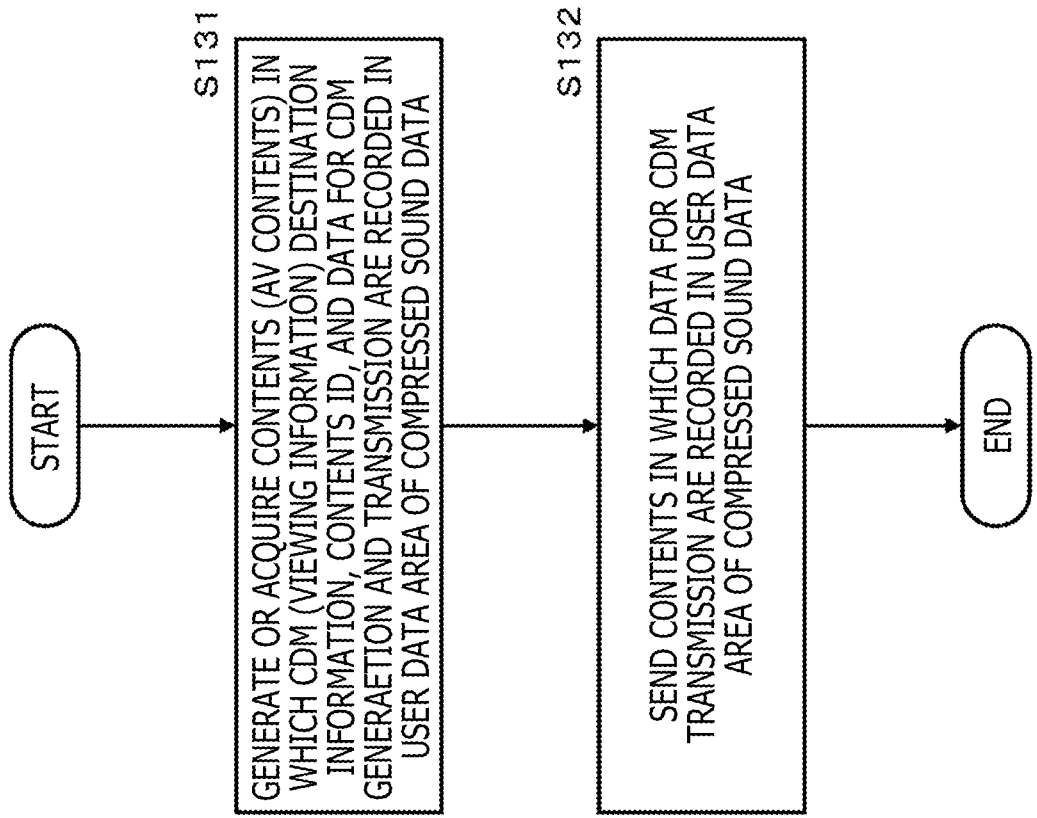
FIG. 23 is a diagram depicting a flowchart which is illustrative of a processing sequence carried out by the transmitting apparatus.

The transmitting apparatus that carries out the process according to the flowchart depicted in FIG. 23 is the transmitting apparatus 20 depicted in FIG. 19, for example, and the transmitting apparatus 20 such as a broadcasting station or the like.

The transmitting apparatus 20 has programs for causing the process according to the flowchart depicted in FIG. 23 to be performed, stored in a storage unit, for example, and executes the programs with a data processor having a CPU that has a program executing function.

The processing of each of the steps of the flow depicted in FIG. 23 will be described below.

(Step S131)

First, the data processor of the transmitting apparatus generates or acquires contents (AV contents) in which CDM (viewing information) destination information, a contents ID, and CDM-compatible data applied to a CDM generation and transmission process are recorded in the user data recording area of the compressed sound data in step S131.

Specifically, the data processor carries out a process of generating or acquiring contents in which CDM (viewing information) destination information, a contents ID, and CDM-compatible data applied to a CDM generation and transmission process are stored in the user data recording area of the compressed sound data or their meta data.

(Step S132)

Next, in step S132, the data processor of the transmitting apparatus sends the contents that store the CDM-compatible data generated in step S131.

Incidentally, as described above, the contents transmission route is not limited to the route to the receiving apparatus 30 via the MVPD 60, but may be either of other routes, e.g., a route via terrestrial broadcasting waves and a route via the broadband communication network such as the Internet or the like.

Next, the sequence of the process carried out by the receiving apparatus for receiving contents and generating and transmitting a CDM will be described below with reference to the flowchart depicted in FIG. 24.

Figure 24:
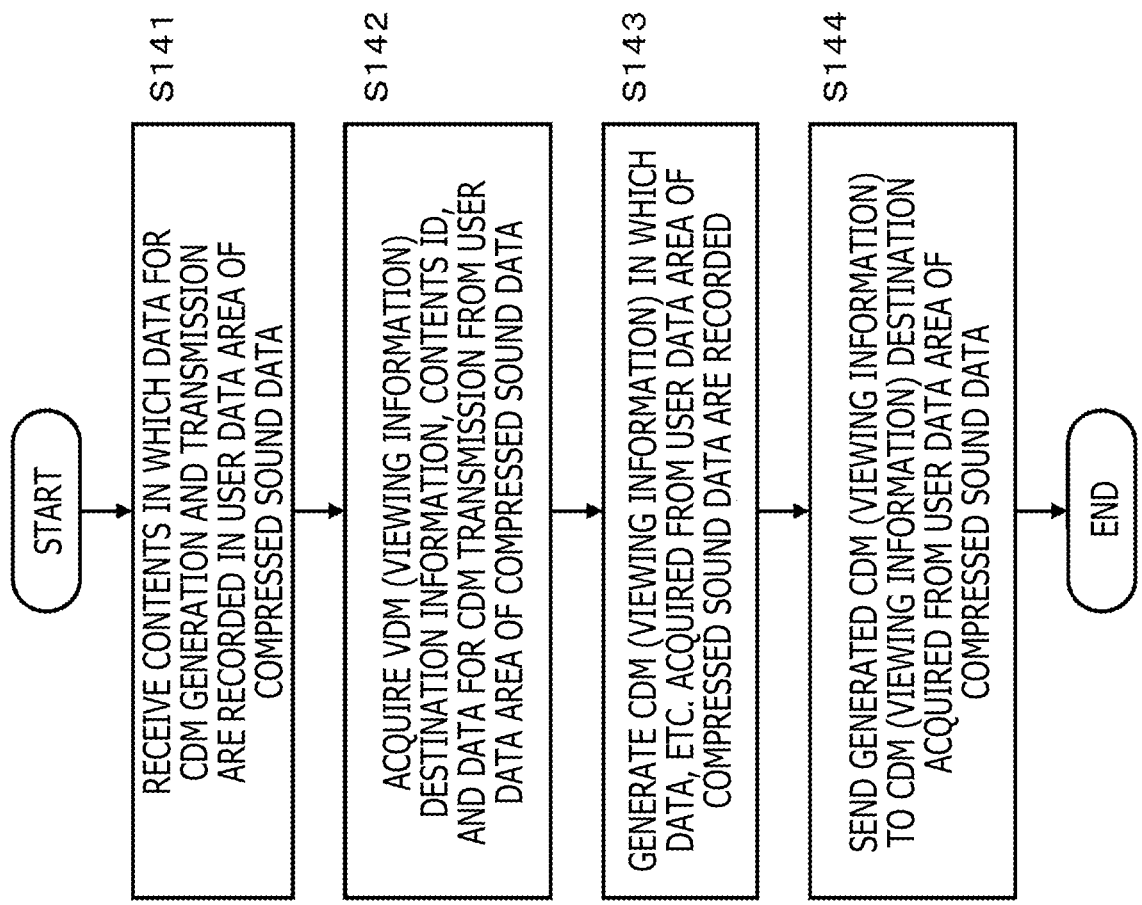
FIG. 24 is a diagram depicting a flowchart which is illustrative of a processing sequence carried out by the receiving apparatus.

Note that the receiving apparatus that carries out the process according to the flowchart depicted in FIG. 24 is the receiving apparatus 30 depicted in FIG. 19, for example.

The receiving apparatus 30 has programs for causing the process according to the flowchart depicted in FIG. 24 to be performed, stored in a storage unit, for example, and executes the programs with a data processor having a CPU that has a program executing function.

The processing of each of the steps of the flow depicted in FIG. 24 will be described below.

(Step S141)

First, the receiving apparatus receives contents (AV contents) in which CDM (viewing information) destination information, a contents ID, and CDM generation and transmission data, etc. are recorded in the user data recording area of the compressed sound data file in step S141.

As described above, the contents reception route is not limited to the route via the MVPD 60, but may be either of a route via terrestrial broadcasting waves and a route via the broadband communication network such as the Internet or the like.

(Step S142)

Next, in step S142, the data processor of the receiving apparatus acquires the CDM destination information, the contents ID, and the CDM generation and transmission data from the user data recording area of the compressed sound data file.

The user data recording area of the compressed sound data that make up the received contents include the CDM-compatible data, i.e., the CDM destination information, the contents ID, and the data required for a CDM generation and transmission process, recorded therein. The data processor of the receiving apparatus acquires these CDM-compatible data.

(Step S143)

Next, in step S143, the data processor of the receiving apparatus generates a CDM using the acquired data from the user data recording area of the compressed sound data file.

Note that the CDM generated by the receiving apparatus should preferably be a CDM according to the extended format described with reference to FIGS. 16 through 18, based on the basic CDM format described earlier with reference to FIG. 3, for example.

(Step S144)

Next, in step S144, the data processor of the receiving apparatus sends the CDM generated in step S143 to an address represented by the CDM destination information acquired from the user data recording area of the compressed sound data file, i.e., the address (URL) information of the viewing information analyzing apparatus 40 depicted in FIG. 1.

Incidentally, providing CDM transmission timing information is acquired from the user data recording area of the compressed sound data file, a CDM transmission timing is determined according to the CDM transmission timing information, and the transmission process is carried out.

In this manner, the receiving apparatus 30 is able to acquire CDM-compatible data required for a CDM generation and transmission process, stored in the user data recording area set in connection with the compressed sound data, generate a CDM by referring to the CDM-compatible data, and send the generated CDM to the viewing information analyzing apparatus.

[7. (Embodiment 3) About an embodiment in which a contents ID is acquired from an MPD and a CDM is generated]

Next, as Embodiment 3, an embodiment in which a contents ID is acquired from an MPD and a CDM is generated will be described below.

The present embodiment is an embodiment optimum for a situation in which the receiving apparatus primarily generates and sends a CDM relative to contents that are received via a broadband communication network such as the Internet or the like.

As with the other embodiments, Embodiment 3 is an embodiment that can utilize any contents transmission routes.

FIG. 25 is a diagram illustrative of a processing example in which the receiving apparatus 30 receives broadcasting contents via the broadband communication network 50 such as the Internet or the like.

The transmitting apparatus 20 such as a terrestrial wave broadcasting station or the like sends broadcasting contents to the receiving apparatus 30 which is the user's terminal such as the TV set or the like of the user via the broadband communication network 50 such as the Internet or the like.

The receiving apparatus 30 outputs the received contents to the receiving apparatus 30 such as the TV set or the like, so that the contents are reproduced.

As depicted in FIG. 25, the data sent via the broadband communication network 50 such as the Internet or the like are only image data and sound data, and do not include signaling data that the transmitting apparatus 20 sends via terrestrial broadcasting waves.

The receiving apparatus 30 reproduces (outputs) the image/sound data input from the broadband communication network 50 such as the Internet or the like in step S61. However, since the signaling data are not received via the broadband communication network 50 such as the Internet or the like, the receiving apparatus 30 is unable to acquire CDM-compatible data such as CDM recording data (viewing channel information, etc.) and CDM destination information (e.g., an address such as a URL or the like), etc., and hence unable to generate and send a CDM.

As an embodiment for solving this problem, Embodiment 3 in which CDM-compatible data are recorded in an MPD will be described below with reference to FIG. 26 and other following figures (Embodiment 3).

FIG. 26 is a diagram illustrative of a processing example in which the receiving apparatus 30 receives broadcasting contents via the broadband communication network 50 such as the Internet or the like, as is the case with the example described with reference to FIG. 25.

The transmitting apparatus 20 such as a terrestrial wave broadcasting station or the like provides the receiving apparatus 30 with image data and sound data that make up broadcasting contents via the broadband communication network 50 such as the Internet or the like.

Concurrent with the above process, the transmitting apparatus 20 such as a terrestrial wave broadcasting station or the like sends signaling data to the receiving apparatus 30 via terrestrial broadcasting waves.

Note that the signaling data are data including access information for AV segments that the receiving apparatus 30 receives via terrestrial broadcasting waves and reproduces, and guide information and control information required for a process after the reception, such as a decoding process or the like, and are repeatedly sent from time to time from the transmitting apparatus 20.

There are various types of signaling data depending on information represented thereby. Specifically, for example, USD (User Service Description) refers to signaling data in units of services.

USD contains various types of control information. Representative control information is an MPD (Media Presentation Description) that is signaling data having a manifest file where various guide information and control information corresponding to contents (AV segments) are stored.

Various signaling data are data required for the receiving apparatus 30 to receive, reproduce, and control AV segments and applications (application programs) sent from the transmitting apparatus 20, and are set as individual files (meta files) for different categories, for example, and sent from the transmitting apparatus.

According to Embodiment 3, as depicted in FIG. 26, the receiving apparatus 30 receives image data and sound data that make up broadcasting contents to be reproduced via the broadband communication network 50.

As indicated in step S71 depicted in FIG. 26, the receiving apparatus 30 further receives an MPD as one of signaling data that the transmitting apparatus 20 sends via terrestrial broadcasting waves, acquires a contents ID from the MPD, and records the acquired contents ID in a CDM.

As described previously, the transmitting apparatus 20 such as the broadcasting station or the like sends contents to the receiving apparatus 30 via terrestrial broadcasting waves according to MPEG-DASH standards that are standards for an adaptive streaming technology, for example.

The MPEG-DASH standards include the following two standards:

(a) Standards with respect to manifest files (MPD: Media Presentation Description) for describing meta data that represent management information for moving images and sound files; and (b) Standards with respect to a file format (segment format) for the transmission of moving image contents.

The transmitting apparatus 20 distributes contents to the receiving apparatus 30 according the above MPEG-DASH standards.

The MPD is one of signaling data according to the MPEG-DASH standards.

The MPD will be described below with reference to FIG. 27 and other following figures.

The MPD (Media Presentation Description) is able to provide the receiving apparatus 30 with various control data in units of periods (Periods) as time zones into which the broadcasting time of a certain program is divided, for example.

FIG. 27 is a diagram depicting an example of the format of the MPD.

The MPD is able to describe information of attributes or the like and control information in units of various prescribed ranges below, for each of streams of image and sound:

(1) a period (Period) that prescribes zones on a time axis;
(2) an adaptation (Adaptation) that prescribes data kinds of image and sound, etc.;
(3) a representation (Representation) that prescribes image types and sound types, etc.; and
(4) a segment info (SegmentInfo) as an information recording area in units of segments (AV segments) of image and sound.

FIG. 28 is a diagram depicting a chronologically developed sequence of information (control information, management information, attribute information, and the like) corresponding to AV segments recorded in the MPD.

It is assumed that time passes from the left to the right. The time axis corresponds to the time over which AV contents are reproduced on the receiving apparatus, for example.

Various items of information corresponding to AV segments are recorded in the MPD. The MPD is part of signaling data, and is sent prior to AV segments, for example.

As described above with reference to FIG. 27, the MPD is able to record information in units of data below:

(1) a period (Period) that prescribes zones on a time axis;
(2) an adaptation (Adaptation) that prescribes data kinds of image and sound, etc.;
(3) a representation (Representation) that prescribes image types and sound types, etc.; and
(4) a segment info (SegmentInfo) as an information recording area in units of segments (AV segments) of image and sound.

FIG. 28 is a diagram depicting these data areas developed over the time axis and according to data types.

FIG. 28 depicts the following two adaptations (Adaptations):

(V) an adaptation V (Adaptation (V)) as an image-compatible information recording area; and (A) an adaptation A (Adaptation (A)) as a sound-compatible information recording area.

(V) The adaptation V (Adaptation (V)) as an image-compatible information recording area has two representations (Representations), indicated below, as information recording areas in units of streams having different attributes:

(V1) a representation (V1) (Representation (V1)) as an information recording area compatible with low-bit-rate images; and (V2) a representation (V2) (Representation (V2)) as an information recording area compatible with high-bit-rate images.

Similarly, (A) the adaptation A (Adaptation (A)) as a sound-compatible information recording area has two representations (Representations), indicated below, as information recording areas in units of streams having different attributes:

(A1) a representation (A1) (Representation (A1)) as an information recording area compatible with Japanese speech; and (A2) a representation (A2) (Representation (A2)) as an information recording area compatible with English speech.

Moreover, each representation (Representation) is arranged to be able to record information in periods on a reproduction time axis and further in units of segments.

For example, a receiving apparatus (client) that selects and reproduces a high-bit-rate image and Japanese speech selects and acquires information about the high-bit-rate image and the Japanese speech to be reproduced from an MPD in reproducing Segment (11) of Period 1. Recorded information of the MPD to be selected becomes information of segment areas 301 and 302 depicted in the figure.

The receiving apparatus 30 selects only information corresponding to data (segment) to be reproduced on its own apparatus from an MPD sent as signaling data from the transmitting apparatus, and refers to the selected information. Information corresponding to segments according to data kinds and in units of time can be recorded in MPDs.

A specific data example of some makeup data of an MPD is illustrated in FIG. 29.

The MPD makeup data depicted in FIG. 29 belong to one period information recording area in the MPD, where a contents ID (EIDR in the illustrated example) is recorded as depicted.

In the example illustrated in FIG. 29, as the contents ID, the data of

EIDR: 10.524~–1E49-W are recorded.

The receiving apparatus 30 can acquire, from the MPD recorded data, the following items of information:

contents ID: 10524~IE49-W; and contents type: EIDR (contents ID corresponding to program contents).

Note that if the contents are advertisement contents, then the MPD recorded data are set as follows:

adID: 11.324~A235-W.

In other words, contents ID type information (adID) indicating a contents ID corresponding to advertisement contents is set prior to the contents ID.

In this fashion, the receiving apparatus 30 can read the contents ID information and the contents ID type information from the MPD.

For reproducing contents received via a route other than terrestrial broadcasting waves, such as data sent via the broadband communication network 50 such as the Internet or the like, the receiving apparatus 30 acquires an MPD via terrestrial broadcasting waves.

By carrying out such an MPD acquiring process, it is possible to acquire a contents ID and a contents ID type recorded in the MPD and record the acquired information in a CDM.

Also in the present embodiment, the CDM generated by the receiving apparatus 30 is a CDM according to the new CDM format described previously with reference to FIGS. 16 through 18. Specifically, the receiving apparatus 30 generates a CDM having the following items of information:

(a) service source information;

(b) contents ID information; and (c) contents ID type information.

Incidentally, with respect to the service source information, the receiving apparatus 30 records it by confirming the route along which the contents have been received.

According to the present embodiment, the MPD does not include CDM destination information and CDM transmission timing information recorded therein, and the receiving apparatus 30 is unable to acquire these items of information from the MPD. However, the receiving apparatus 30 can acquire a CDM destination address and transmission timing information from signaling data provided by the transmitting apparatus 20, other than the MPD.

Alternatively, the transmitting apparatus 20 may be arranged to record CDM destination information and transmission timing information in a MPD and send the MPD.

Further alternatively, as an arrangement to combine the process according to Embodiment 3 and the processes described above in Embodiments 1 and 2, the receiving apparatus 30 may be arranged to acquire information necessary for generating and transmitting a CDM.

[8. About sequences of processes (Embodiment 3) carried out by the transmitting apparatus and the receiving apparatus]

Next, sequences of processes carried out by the transmitting apparatus and the receiving apparatus will be described below with reference to flowcharts depicted in FIGS. 30 and 31.

First, the sequence of the process carried out by the transmitting apparatus will be described below with reference to the flowchart depicted in FIG. 30.

Figure 30:
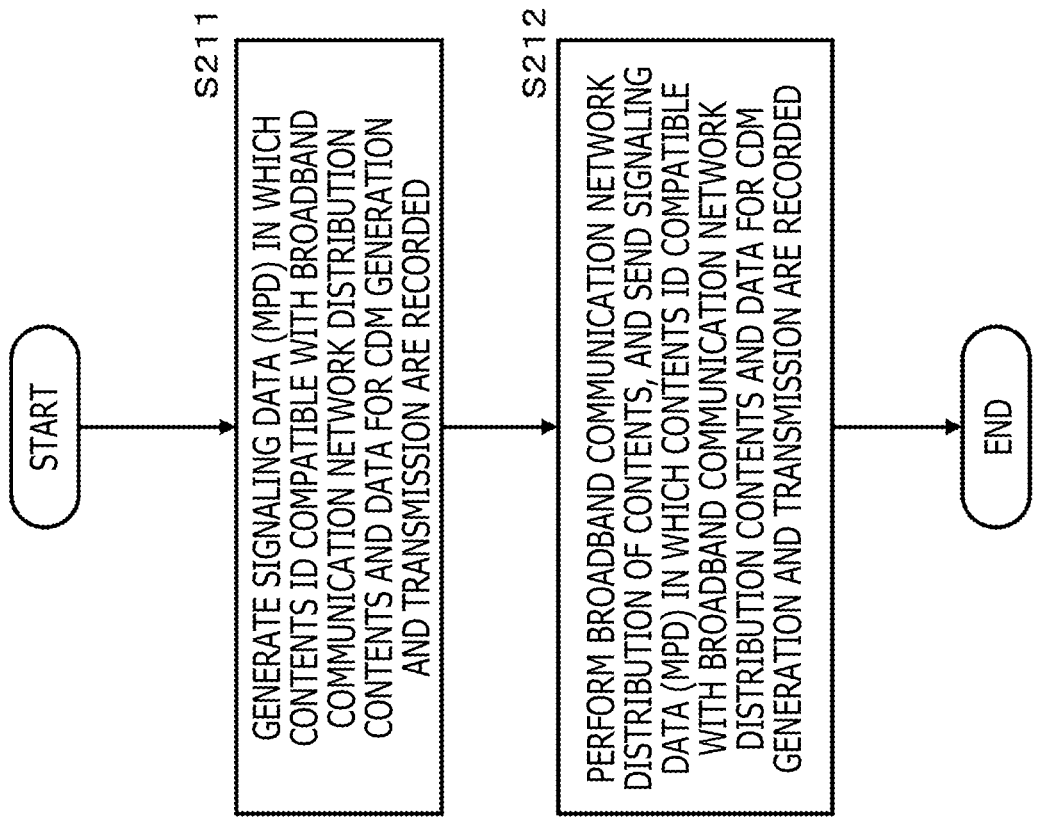
FIG. 30 is a diagram depicting a flowchart which is illustrative of a processing sequence carried out by the transmitting apparatus.

Note that the transmitting apparatus that carries out the process according to the flowchart depicted in FIG. 30 is the transmitting apparatus 20 depicted in FIG. 26, for example, and the transmitting apparatus 20 such as a broadcasting station or the like.

The transmitting apparatus 20 has programs for causing the process according to the flowchart depicted in FIG. 30 to be performed, stored in a storage unit, for example, and executes the programs with a data processor having a CPU that has a program executing function.

The processing of each of the steps of the flow depicted in FIG. 30 will be described below.

(Step S211)

First, the data processor of the transmitting apparatus generates signaling data (MPD) in which a contents ID corresponding to broadband communication network distribution contents and CDM generation and transmission data are recorded in step S211.

Specifically, the data processor generates an MPD in which a contents ID, etc. is recorded as described with reference to FIG. 29, for example.

(Step S212)

Next, in step S212, the data processor of the transmitting apparatus performs a broadband communication network distribution of the contents, and sends the signaling data (MPD) in which the contents ID corresponding to broadband communication network distribution contents and the CDM generation and transmission data are recorded.

Incidentally, as described above, the contents transmission route is not limited to the route to the receiving apparatus 30 via the broadband communication network 50, but may be either of other routes, e.g., a route via terrestrial broadcasting waves and a route via the MVPD.

Next, the sequence of the process carried out by the receiving apparatus for receiving contents and generating and transmitting a CDM will be described below with reference to the flowchart depicted in FIG. 31.

Figure 31:
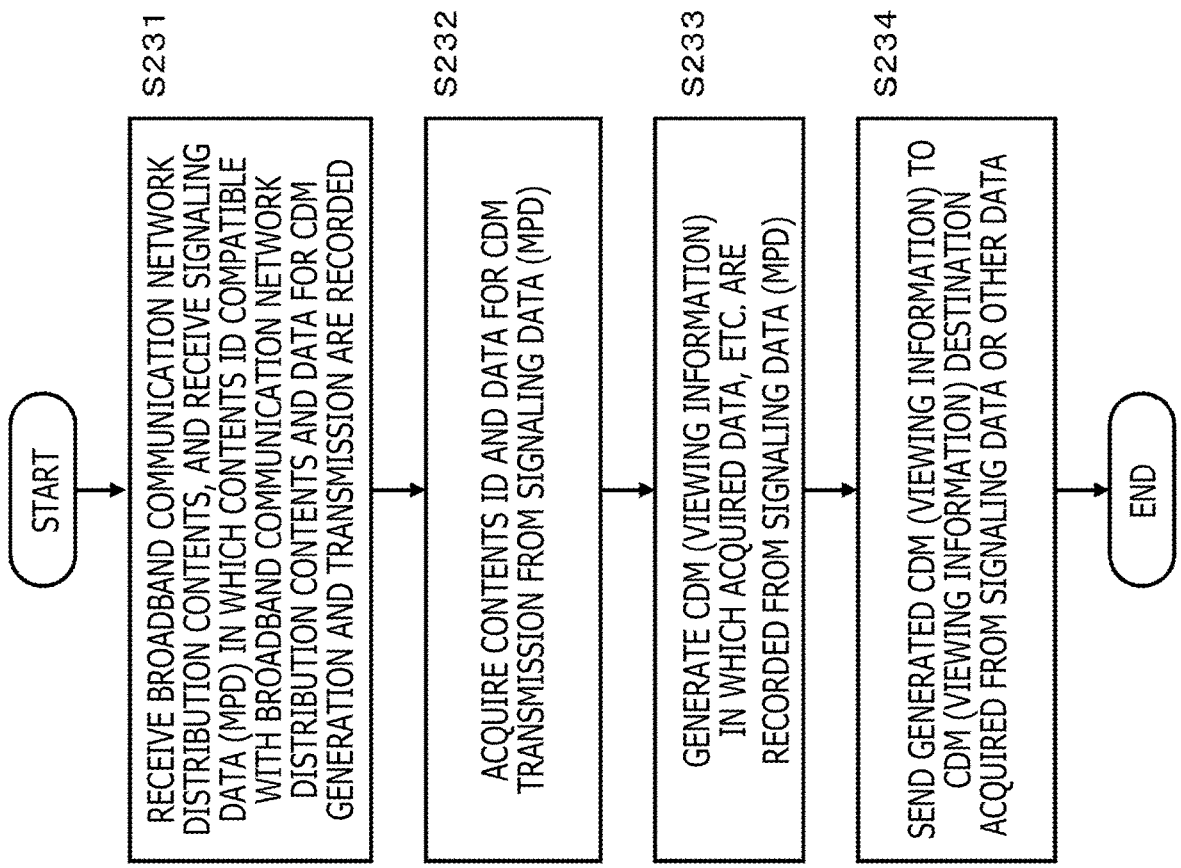
FIG. 31 is a diagram depicting a flowchart which is illustrative of a processing sequence carried out by the receiving apparatus.

Note that the receiving apparatus that carries out the process according to the flowchart depicted in FIG. 31 is the receiving apparatus 30 depicted in FIG. 26, for example.

The receiving apparatus 30 has programs for causing the process according to the flowchart depicted in FIG. 31 to be performed, stored in a storage unit, for example, and executes the programs with a data processor having a CPU that has a program executing function.

The processing of each of the steps of the flow depicted in FIG. 31 will be described below.

(Step S231)

First, the receiving apparatus receives broadband communication network distribution contents, and further receives signaling data (MPD) in which a contents ID corresponding to broadband communication network distribution contents and CDM generation and transmission data are recorded in step S231.

As described above, the contents transmission route is not limited to the route via the broadband communication network 50, but may be either of a route via terrestrial broadcasting waves and a route via the MVPD 60.

(Step S232)

Next, the data processor of the receiving apparatus acquires a contents ID and CDM transmission data from the signaling data (MPD) in step S232.

For example, the data processor acquires a contents ID, contents ID type information, and the like from the MPD depicted in FIG. 29, for example.

(Step S233)

Next, the data processor of the receiving apparatus generates a CDM (viewing information) in which the acquired data, etc. are recorded from the signaling data (MPD) in step S233.

Note that the CDM generated by the receiving apparatus should preferably be a CDM according to the extended format described with reference to FIGS. 16 through 18, based on the basic CDM format described earlier with reference to FIG. 3, for example.

(Step S234)

Next, in step S234, the data processor of the receiving apparatus sends the generated CDM (viewing information) to a CDM (viewing information) destination acquired from the signaling data or other data.

Specifically, the data processor sends the CDM generated in step S233 to an address represented by the address (URL) information of the viewing information analyzing apparatus 40 depicted in FIG. 1.

Incidentally, providing CDM transmission timing information is acquired from the MPD or other data than the MPD, a CDM transmission timing is determined according to the CDM transmission timing information, and the transmission process is carried out.

As described above, the receiving apparatus 30 can acquire a CDM destination address and transmission timing information from signaling data provided by the transmitting apparatus 20, other than the MPD.

Alternatively, the transmitting apparatus 20 may be arranged to record CDM destination information and transmission timing information in a MPD and send the MPD.

Further alternatively, in combination with the process according to Embodiment 3 and the processes described above in Embodiments 1 and 2, the receiving apparatus 30 may be arranged to acquire information necessary for generating and transmitting a CDM.

According to the present embodiment, since the receiving apparatus 30 is thus arranged to use a contents ID and contents ID type information recorded in an MPD as CDM recording information, the receiving apparatus 30 is able to reliably acquire CDM recording data from the MPD even when it receives contents from a route such as the Internet or the like other than terrestrial broadcasting waves and reproduces the received contents.

[9. About a configurational example of the transmitting apparatus and the receiving apparatus]

Next, a configurational example of the transmitting apparatus 20 and the receiving apparatus 30, which serve as communication apparatus, will be described below with reference to FIGS. 32 and 33.

Figure 32:
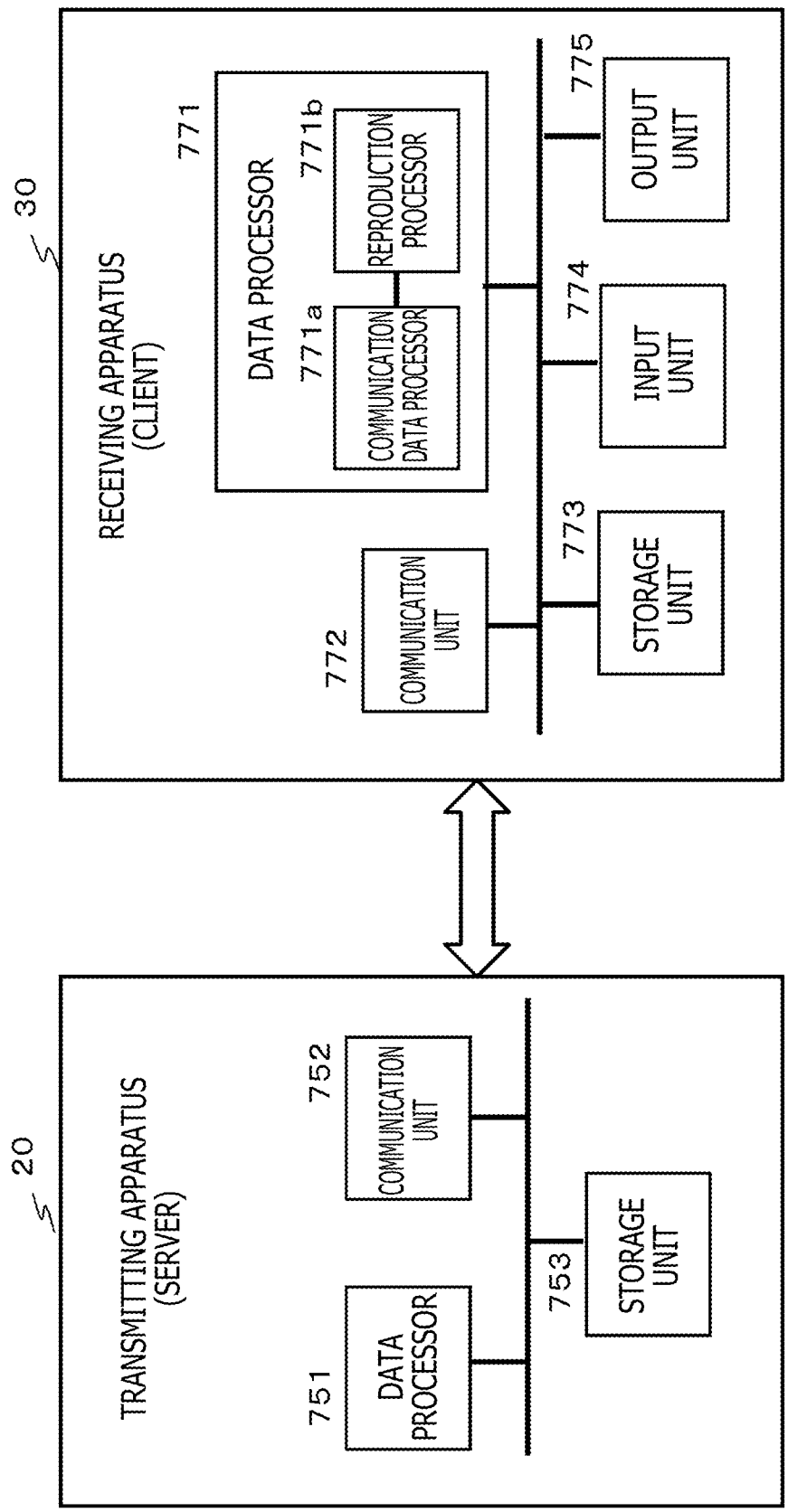
FIG. 32 is a diagram illustrative of a configurational example of the transmitting apparatus and the receiving apparatus.

FIG. 32 depicts a configurational example of the transmitting apparatus 20 and the receiving apparatus 30.

The transmitting apparatus 20 has a data processor 751, a communication unit 752, and a storage unit 753.

The receiving apparatus 30 has a data processor 771, a communication unit 772, a storage unit 773, an input unit 774, and an output unit 775.

The data processor includes a communication data processor 771a and a reproduction processor 771b.

The data processor 751 of the transmitting apparatus 20 performs various data processing processes for carrying out data distribution services. For example, the data processor 751 performs a process of controlling the generation and transmission of configuration data of the data distribution services. Furthermore, the data processor 751 performs a process of generating and sending contents, applications, various other data, and signaling data to be provided to the receiving apparatus 30.

Moreover, the data processor 751 performs a process of generating and recording CDM-compatible data to be applied to a CDM generation and transmission process. The process of recording CDM-compatible data includes a process of recording data in an electronic watermark (WM) and a process of recording data in other data recording areas.

The communication unit 752 performs a communication process for distributing AV segments, applications, various other data, signaling data, and the like.

The storage unit 753 stores therein AV segments to be distributed, applications, data used by applications, signaling data, and the like.

In addition, the storage unit 753 is used as a work area for data processing processes carried out by the data processor 751, and also as a storage area for various parameters.

The receiving apparatus 30 has the data processor 771, the communication unit 772, the storage unit 773, the input unit 774, and the output unit 775.

The communication unit 772 receives data distributed from the transmitting apparatus 20, e.g., AV segments, applications, signaling data, and the like.

The data processor 771 has the communication data processor 771a and the reproduction processor 771b, and performs the processes, etc. according to the embodiments described above, for example.

Specifically, the data processor 771 carries out the process of generating a CDM, the process of transmitting a CDM, etc.

For example, the data processor 771 acquires information required for generating and transmitting a CDM from an electronic watermark (WM), an MPD, and other data areas, generates a CDM, and sends the generated CDM to the viewing information analyzing apparatus.

Instruction commands from the user, e.g., various commands for selecting channels, activating applications, and installing applications, etc. are input through the input unit 774.

Reproduced data are output to the output unit 775 including a display, a speaker, or the like.

The storage unit 773 stores therein AV segments, applications, data used by applications, signaling data, and the like.

In addition, the storage unit 773 is used as a work area for data processing processes carried out by the data processor 771, and also as a storage area for various parameters.

FIG. 33 depicts a hardware configurational example of a communication apparatus applicable as the transmitting apparatus 20 and the receiving apparatus 30.

A CPU (Central Processing Unit) 801 functions as a data processor for performing various processes according to programs stored in a ROM (Read Only Memory) 802 or a storage unit 808. For example, the CPU 801 performs processes according to the sequences described in the above embodiments. A RAM (Random Access Memory) 803 stores programs performed by the CPU 801 and data therein. The CPU 801, the ROM 802, and the RAM 803 are interconnected by a bus 804.

The CPU 801 is connected to an input/output interface 805 by the bus 804. To the input/output interface 805, there are connected an input unit 806 including various switches, a keyboard, a mouse, a microphone, etc., and an output unit 807 including a display, a speaker, etc. The CPU 801 performs various processes in response to commands input from the input unit 806, and outputs results of the processes to the output unit 807, for example.

The storage unit 808 that is connected to the input/output interface 805 includes a hard disk or the like, for example, and stores programs executed by the CPU 801 and various data therein. A communication unit 809 functions as a transmitter/receiver for data communication via a network such as the Internet, a local area network, or the like, and also as a transmitter/receiver for broadcasting waves, and communicates with external apparatus.

A drive 810 that is connected to the input/output interface 805 drives a removable medium 811 such as a magnetic disk, an optical disk, a magnetooptical disk, or a semiconductor memory such as a memory card or the like, for recording and reading data.

A process of encoding or decoding data can be performed as a process of the CPU 801 serving as a data processor. However, the communication apparatus may have a codec as dedicated hardware for carrying out an encoding process or a decoding process.

[10. A summary of the arrangement of the present disclosure]

Embodiments of the present disclosure have been described in detail above with reference to the particular embodiments. However, it is obvious that the embodiments can be modified or replaced by those skilled in the art without departing from the scope of the present disclosure. In other words, the present invention has been disclosed by way of illustrative example, and should not be restrictively interpreted. The scope of claims for patent should be taken into consideration in order to determine the scope of the present disclosure.

Note that the technology disclosed in the present description may be presented in the following configurations:

(1) A receiving apparatus including:
a communication unit that receives contents in which viewing information-compatible data applicable to generation of viewing information are embedded as an electronic watermark (WM); and
a data processor that performs a process of generating viewing information using the viewing information-compatible data acquired from the electronic watermark (WM) embedded in the received contents.

(2) The receiving apparatus according to (1), in which the data processor:
performs a process of outputting the received contents to an output unit; and
analyzes the electronic watermark (WM) embedded in output contents from the output unit, acquires the viewing information-compatible data from the electronic watermark (WM), generates the viewing information using the acquired viewing information-compatible data, and sends the generated viewing information to a viewing information analyzing apparatus.

(3) The receiving apparatus according to (1) or (2), in which the electronic watermark information is embedded in at least either of image data and sound data that make up the contents; and
the data processor performs a process of acquiring the viewing information-compatible data by applying an electronic watermark (WM) analysis on at least either of the image data and the sound data.

(4) The receiving apparatus according to any one of (1) through (3), in which the electronic watermark (WM) includes a contents ID recorded therein as an identifier of the contents in which the electronic watermark is embedded; and
the data processor acquires the contents ID from the electronic watermark (WM) and uses the acquired contents ID as recording data of the viewing information.

(5) The receiving apparatus according to (4), in which the electronic watermark (WM) includes contents ID type information indicating the type of the contents ID; and
the data processor acquires the contents ID type information from the electronic watermark (WM) and uses the acquired contents ID type information as recording data of the viewing information.

(6) The receiving apparatus according to (5), in which the type information is type information indicating whether the contents ID is a program contents ID or an advertisement contents ID.

(7) The receiving apparatus according to any one of (1) through (6), in which the electronic watermark (WM) includes destination information of the viewing information recorded therein; and
the data processor acquires the destination information from the electronic watermark (WM) and sends the generated viewing information to an address designated by the destination information.

(8) A receiving apparatus including:
a communication unit that receives contents in which viewing information-compatible data applicable to generation of viewing information are stored in a sound data storage file; and
a data processor that performs a process of generating viewing information using the viewing information-compatible data acquired from recording data in the sound data storage file of the received contents.

(9) The receiving apparatus according to (8), in which the viewing information-compatible data are stored in a user data recording area set in the sound data storage file; and
the data processor acquires the viewing information-compatible data from the user data recording area in the sound data storage file, generates the viewing information using the acquired viewing information-compatible data, and sends the generated viewing information to a viewing information analyzing apparatus.

(10) The receiving apparatus according to (8) or (9), in which the sound data storage file stores a contents ID recorded therein as an identifier of the contents including the sound data storage file as a component thereof; and
the data processor acquires the contents ID from the sound data storage file and uses the acquired contents ID as recording data of the viewing information.

(11) The receiving apparatus according to (10), in which the sound data storage file stores contents ID type information indicating the type of the contents ID; and
the data processor acquires the contents ID type information from the sound data storage file and uses the acquired contents ID type information as recording data of the viewing information.

(12) The receiving apparatus according to (11), in which the type information is type information indicating whether the contents ID is a program contents ID or an advertisement contents ID.

(13) The receiving apparatus according to any one of (8) through (12), in which the sound data storage file stores destination information of the viewing information recorded therein; and the data processor acquires the destination information from the sound data storage file and sends the generated viewing information to an address designated by the destination information.

(14) A receiving apparatus including:

a communication unit that receives signaling data storing therein viewing information-compatible data applicable to generation of viewing information and that receives reproduction contents via a communication path different from a reception route of the signaling data; in which the receiving apparatus outputs the reproduction contents to an output unit, acquires recording data of viewing information with respect to output contents of the output unit from the signaling data, generates viewing information using the acquired data, and sends the generated viewing information to a viewing information analyzing apparatus.

(15) The receiving apparatus according to (14), in which the data processor generates viewing information corresponding to reproduction contents received via a broadband communication network, using acquired data from signaling data received via terrestrial broadcasting waves.

(16) The receiving apparatus according to (14) or (15), in which the signaling data is an MPD (Media Presentation Description) prescribed by MPEH-DASH standards.

(17) A transmitting apparatus including:

a data processor that sends viewing information-compatible data applicable to generation of viewing information in a receiving apparatus, by generating contents recorded in a reproduction data storage file.

(18) The transmitting apparatus according to (17), in which the data processor sends the viewing information-compatible data by generating contents recorded in either of:

(a) an electronic watermark (WM) embedded in image data or sound data that make up the contents; and (b) a user data recording area set in a file that stores sound data that make up the contents.

(19) A data processing method adapted to be carried out in a receiving apparatus, in which a communication unit receives contents in which viewing information-compatible data applicable to generation of viewing information are embedded as an electronic watermark (WaterMark); and a data processor performs a process of generating viewing information using the viewing information-compatible data acquired from the electronic watermark (WM) embedded in the received contents.

(20) A data processing method adapted to be carried out in a transmitting apparatus, in which a data processor sends viewing information-compatible data applicable to generation of viewing information in a receiving apparatus, by generating contents recorded in a reproduction data storage file.

Furthermore, the sequence of processes described in the description may be hardware-implemented or software-implemented or implemented by a hybrid of hardware and software. If the sequence of processes is software-implemented, then programs in which the processing sequence is recorded may be installed in a memory in a computer incorporated in dedicated hardware and executed thereby, or may be installed in a general-purpose computer capable of performing various processes and executed thereby. For example, the programs may be recorded in a recording medium in advance. The programs may be installed from the recording medium into the computer, or may be received via a network such as a LAN (Local Area Network) or the Internet and installed into a recording medium such as a built-in hard disk or the like.

Note that the various processes described in the description may be carried out in chronological order in the sequence described above, or may be carried out parallel to each other or individually either depending on the processing capability of the apparatus that perform the processes or as required. Further, in the present description, the term "system" means a logical collection of a plurality of apparatus, and is not limited to the arrangement in which the apparatus are present in the same housing.

INDUSTRIAL APPLICABILITY

According to the arrangement of the embodiments of the present disclosure, as described above, there is provided an arrangement capable of reliably generating and transmitting viewing information with respect to contents received via a communication route other than terrestrial broadcasting waves.

Specifically, for example, contents in which a contents ID applicable to the generation of viewing information and viewing information-compatible data such as viewing information destination information or the like are recorded in an electronic watermark (WM) or a sound data file are sent from a transmitting apparatus to a receiving apparatus. The receiving apparatus acquires the contents ID and the viewing information destination information, etc. from the electronic watermark (WM) or the sound data file, generates viewing information using the acquired data, and sends the generated viewing information to a designated address.

This arrangement makes it possible to reliably generate and transmit viewing information with respect to contents received via a communication route other than terrestrial broadcasting waves.

REFERENCE SIGNS LIST

20 Transmitting apparatus
21 Broadcasting server
30 Receiving apparatus
31 TV set
40 Viewing information analyzing apparatus
41 Viewing information analyzing server
50 Broadband communication network
60 MVPD
70 Set-top box (STB)
751 Data processor
752 Communication unit
753 Storage unit
771 Data processor
772 Communication unit
773 Storage unit
774 Input unit
775 Output unit
801 CPU
802 ROM
803 RAM
804 Bus
805 Input/output interface
806 Input unit
807 Output unit
808 Storage unit
809 Communication unit 810 Drive
811 Removable medium

The invention claimed is:

1. A receiving apparatus, comprising:
a receiver configured to receive content in which an electronic watermark (WM) is embedded, the WM including a WM message applicable to generation of a viewing information message, the WM message including an identification of the WM message;
processing circuitry configured to generate the viewing information message according to the WM message acquired from the WM embedded in the received content, the viewing information message including a usage report regarding the content; and
a transmitter configured to transmit the viewing information message to an external server device.

2. The receiving apparatus according to claim 1, wherein the processing circuitry is configured to:
perform a process of outputting the received content to an output device;
analyze the WM embedded in the received content; and acquire the WM message from the WM.

3. The receiving apparatus according to claim 1, wherein the WM is embedded in image data or sound data of the received content, and
the processing circuitry is further configured to acquire the WM message by applying an WM analysis on at least the image data or the sound data of the received content.

4. The receiving apparatus according to claim 1, wherein the WM message includes a content ID as an identifier of the content in which the WM is embedded, and
the processing circuitry is further configured to acquire the content ID from the WM message and generate the viewing information message to include the acquired content ID.

5. The receiving apparatus according to claim 4, wherein the WM message includes content ID type information indicating a type of the content ID, and
the processing circuitry is further configured to acquire the content ID type information from the WM message and generate the viewing information message to include the acquired content ID type information.

6. The receiving apparatus according to claim 5, wherein the content ID type information indicates whether the content ID is a program content ID or an advertisement content ID.

7. The receiving apparatus according to claim 1, wherein the WM message includes destination information, and
the processing circuitry is further configured to acquire the destination information from WM message and cause the transmitter to transmit the viewing information message to the external server device at an address designated by the destination information.

8. A data processing method, comprising:
receiving, by a receiver of a receiving apparatus, content in which an electronic watermark (WM) is embedded, the WM including a WM message applicable to generation of a viewing information message, the WM message including an identification of the WM message;
generating, by processing circuitry of the receiving apparatus, the viewing information message according to the WM message acquired from the WM embedded in the received content, the viewing information message including a usage report regarding the content; and
transmitting, by a transmitter of the receiving apparatus, the viewing information message to an external server device.

9. The data processing method according to claim 8, further comprising:
outputting the received content to an output device;
analyzing the WM embedded in the received content; and
acquiring the WM message from the WM.

10. The data processing method according to claim 8, wherein
the WM is embedded in image data or sound data of the received content, and
the data processing method further comprises acquiring the WM message by applying an WM analysis on at least the image data or the sound data of the received content.

11. The data processing method according to claim 8, wherein
the WM message includes a content ID as an identifier of the content in which the WM is embedded, and
the data processing method further comprises acquiring the content ID from the WM message and generating the viewing information message to include the acquired content ID.

12. The data processing method according to claim 11, wherein
the WM message includes content ID type information indicating a type of the content ID, and
the data processing method further comprises acquiring the content ID type information from the WM message and generating the viewing information message to include the acquired content ID type information.

13. The data processing method according to claim 12, wherein the content ID type information indicates whether the content ID is a program content ID or an advertisement content ID.

14. The data processing method according to claim 8, wherein
the WM message includes destination information, and
the data processing method further comprises acquiring the destination information from WM message and causing the transmitter to transmit the viewing information message to the external server device at an address designated by the destination information.

15. A non-transitory computer-readable medium storing instructions which when executed by a computer cause the computer to perform a data processing method, the data processing method comprising:
receiving content in which an electronic watermark (WM) is embedded, the WM including a WM message applicable to generation of a viewing information message, the WM message including an identification of the WM message;
generating the viewing information message according to the WM message acquired from the WM embedded in the received content, the viewing information message including a usage report regarding the content; and
transmitting the viewing information message to an external server device.

16. The non-transitory computer-readable medium according to claim 15, wherein the data processing method further comprises:
outputting the received content to an output device;
analyzing the WM embedded in the received content; and
acquiring the WM message from the WM.

17. The non-transitory computer-readable medium according to claim 15, wherein
  the WM is embedded in image data or sound data of the received content, and
  the data processing method further comprises acquiring the WM message by applying an WM analysis on at least the image data or the sound data of the received content.

18. The non-transitory computer-readable medium according to claim 15, wherein
  the WM message includes a content ID as an identifier of the content in which the WM is embedded, and
  the data processing method further comprises acquiring the content ID from the WM message and generating the viewing information message to include the acquired content ID.

19. The non-transitory computer-readable medium according to claim 18, wherein
  the WM message includes content ID type information indicating a type of the content ID, and
  the data processing method further comprises acquiring the content ID type information from the WM message and generating the viewing information message to include the acquired content ID type information.

20. The non-transitory computer-readable medium according to claim 19, wherein the content ID type information indicates whether the content ID is a program content ID or an advertisement content ID.

* * * * *